US011641669B2

(12) United States Patent
Nakashima et al.

(10) Patent No.: US 11,641,669 B2
(45) Date of Patent: May 2, 2023

(54) APPARATUS AND METHODS FOR LBT IN A BWP

(71) Applicants: SHARP KABUSHIKI KAISHA, Sakai (JP); FG Innovation Company Limited, Tuen Mun (HK)

(72) Inventors: Daiichiro Nakashima, Sakai (JP); Tomoki Yoshimura, Sakai (JP); Wataru Ouchi, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/980,811

(22) PCT Filed: Mar. 1, 2019

(86) PCT No.: PCT/JP2019/008163
§ 371 (c)(1),
(2) Date: Sep. 14, 2020

(87) PCT Pub. No.: WO2017/176593
PCT Pub. Date: Sep. 19, 2019

(65) Prior Publication Data
US 2021/0092772 A1 Mar. 25, 2021

(30) Foreign Application Priority Data
Mar. 15, 2018 (JP) .............................. JP2018-047669

(51) Int. Cl.
*H04W 74/08* (2009.01)
*H04W 72/04* (2009.01)
(Continued)

(52) U.S. Cl.
CPC ......... *H04W 74/0816* (2013.01); *H04L 5/001* (2013.01); *H04L 5/0053* (2013.01);
(Continued)

(58) Field of Classification Search
CPC ........... H04W 74/0816; H04W 72/042; H04W 72/0453; H04W 74/008; H04W 76/27;
(Continued)

(56) References Cited

U.S. PATENT DOCUMENTS

2018/0234988 A1 8/2018 Shimezawa et al.
2019/0141546 A1* 5/2019 Zhou ..................... H04L 5/0057
(Continued)

FOREIGN PATENT DOCUMENTS

WO     2016155526 A1    10/2016
WO     2017/022776 A1    2/2017
(Continued)

OTHER PUBLICATIONS

Huawei, HiSilicon, "CORESET configuration and search space design", R1-1719387, 3GPP TSG RAN WG1 Meeting #91, Reno, USA, Nov. 27-Dec. 1, 2017.
(Continued)

*Primary Examiner* — Omar J Ghowrwal
(74) *Attorney, Agent, or Firm* — ScienBiziP, P.C.

(57) ABSTRACT

A terminal apparatus for receiving a Physical Downlink Control Channel (PDCCH) is provided. The terminal apparatus includes: a radio resource control layer processing unit configured to configure a control resource set based on Radio Resource control (RRC) signaling; a receiver configured to monitor a plurality of PDCCH candidates in the control resource set; and a decoding unit configured to decode a PDCCH candidate of the plurality of PDCCH candidates where the control resource set is configured for a Listen-Before-Talk subband (LBT subband) in a bandwidth part (BWP).

12 Claims, 15 Drawing Sheets

(51) Int. Cl.
  *H04W 74/00*      (2009.01)
  *H04W 76/27*      (2018.01)
  *H04L 5/00*       (2006.01)
  *H04L 27/00*      (2006.01)
  *H04W 72/0453*    (2023.01)

(52) U.S. Cl.
  CPC ....... *H04L 27/0006* (2013.01); *H04W 72/042* (2013.01); *H04W 72/0406* (2013.01); *H04W 72/0453* (2013.01); *H04W 74/006* (2013.01); *H04W 74/008* (2013.01); *H04W 76/27* (2018.02)

(58) Field of Classification Search
  CPC ............ H04W 74/006; H04W 72/0406; H04L 5/001; H04L 5/0053; H04L 27/0006
  See application file for complete search history.

(56) References Cited

U.S. PATENT DOCUMENTS

| | | | | |
|---|---|---|---|---|
| 2019/0141734 | A1* | 5/2019 | Lei | H04L 5/0098 |
| 2020/0059961 | A1* | 2/2020 | Do | H04W 74/0808 |
| 2021/0058967 | A1* | 2/2021 | Oteri | H04W 74/0808 |
| 2021/0204316 | A1* | 7/2021 | Ye | H04W 74/0833 |
| 2021/0345354 | A1 | 11/2021 | Kusashima | |
| 2021/0352633 | A1* | 11/2021 | Tiirola | H04W 16/14 |

FOREIGN PATENT DOCUMENTS

| | | |
|---|---|---|
| WO | 2017099869 A1 | 6/2017 |
| WO | 2017198175 A1 | 11/2017 |
| WO | 2018/030016 | 2/2018 |
| WO | 2019/094781 | 5/2019 |
| WO | 2019/160741 | 8/2019 |

OTHER PUBLICATIONS

MediaTek Inc., "Design of GC PDCCH", R1-1716200, 3GPP TSG RAN WG1 Meeting AH_NR#3, Nagoya, Japan, Sep. 18-21, 2017.

Huawei, HiSilicon, "Remaining issues on bandwidth part and wideband operation", R1-1800018, 3GPP TSG RAN WG1 NR Ad Hoc Meeting, Vancouver, Canada, Jan. 22-26, 2018.

NTT DOCOMO, "New SID Proposal: Study on New Radio Access Technology", RP-160671, 3GPP TSG RAN Meeting #71 Sweden, Mar. 7-10, 2016.

Qualcomm Incorporated, "Revised SID on NR-based Access to Unlicensed Spectrum ", RP-171601, 3GPP TSG RAN Meeting #77 Sapporo, Japan, Sep. 11-14, 2017.

* cited by examiner

APPARATUS AND METHODS FOR LBT IN A BWP

FIELD

The present disclosure relates to a terminal apparatus, a base station apparatus, and a communication method. This application claims priority based on JP 2018-047669 filed on Mar. 15, 2018, the contents of which are incorporated herein by reference.

BACKGROUND

In the 3rd Generation Partnership Project (3GPP), specifications of a radio access method and a radio network for cellular mobile communications (hereinafter referred to as "Long Term Evolution (LTE)" or "Evolved Universal Terrestrial Radio Access (EUTRA)") have been drafted. In LTE, a base station apparatus is also referred to as an evolved NodeB (eNodeB), and a terminal apparatus is also referred to as User Equipment (UE). LTE is a cellular communication system in which multiple areas are deployed in a cell structure, with each of the multiple areas being covered by a base station apparatus. A single base station apparatus may manage multiple cells.

3GPP has been studying a next generation standard (New Radio (NR)) (NPL 1) to make a proposal for International Mobile Telecommunication (IMT)-2020, a standard for a next-generation mobile communication system, standardized by the International Telecommunication Union (ITU). NR is required to satisfy requirements for three scenarios including enhanced Mobile BroadBand (eMBB), massive Machine Type Communication (mMTC), and Ultra Reliable and Low Latency Communication (URLLC) in a single technology framework.

Further, application of NR in a frequency band that does not require license (Unlicensed Spectrum) has been under study (NPL 2). Implementation of a data rate of several Gbps by applying NR supporting a wide band of 100 MHz to a carrier of the frequency band that does not require license has been under study.

CITATION LIST

Non Patent Literature

NPL 1: "New SID proposal: Study on New Radio Access Technology," RP-160671, NTT DOCOMO Inc., 3GPP TSG RAN Meeting #71, Goteborg, Sweden, 7 to 10 Mar. 2016.

NPL 2: "Revised SID on NR-based Access to Unlicensed Spectrum", RP-171601, Qualcomm Incorporated, 3GPP TSG RAN Meeting #77, Sapporo, Japan, 11 to 14 Sep. 2017.

SUMMARY

Problem

In some countries around the world, Listen-Before-Talk (LBT) needs to be applied to frequency bands that do not require license. LBT refers to a mechanism in which carrier sensing is performed before transmission is started, and only in a case that it is confirmed that resources (channels) are not used in other neighboring systems as a result of the carrier sensing, transmission within a prescribed time length is enabled.

One implementation of the present disclosure implements application of LBT in frequency bands that do not require license and application of NR at the same time. One implementation of the present disclosure provides a terminal apparatus capable of efficiently performing wideband communication, a communication method used in the terminal apparatus, a base station apparatus capable of efficiently performing wideband communication, and a communication method used in the base station apparatus.

Solution to Problem

A first implementation of the present disclosure is a terminal apparatus for receiving a physical downlink control channel (PDCCH), the terminal apparatus including: a radio resource control layer processing unit configured to configure a control resource set based on radio resource control (RRC) signaling; a receiver configured to monitor a plurality of PDCCH candidates in the control resource set; and a decoding unit configured to decode a PDCCH candidate of the plurality of PDCCH candidates, where the control resource set is configured for a listen-before-talk (LBT) subband in a bandwidth part (BWP).

In the first implementation of the present disclosure, further, in each of a plurality of control resource sets, the PDCCH is received that includes control information indicating a subframe configuration of the LBT subband corresponding to the control resource set.

In the first implementation of the present disclosure, further, each of the plurality of control resource sets is configured by using multiple resource blocks in the LBT subband corresponding to the control resource set.

A second implementation of the present disclosure is a communication method used in a terminal apparatus for receiving a physical downlink control channel (PDCCH), the communication method including: configuring a control resource set, based on radio resource control (RRC) signaling; monitoring a plurality of PDCCH candidates in the control resource set; and decoding a PDCCH candidate of the plurality of PDCCH candidates, where the control resource set is configured for a listen-before-talk (LBT) subband in a bandwidth part (BWP).

In the second implementation of the present disclosure, further, in each of a plurality of control resource sets, the PDCCH is received that includes control information indicating a subframe configuration of the LBT subband corresponding to the control resource set.

In the second implementation of the present disclosure, further, each of the plurality of control resource sets is configured by using multiple resource blocks in the LBT subband corresponding to the control resource set.

A third implementation of the present disclosure is a base station apparatus for transmitting a physical downlink control channel (PDCCH), the base station apparatus including: a radio resource control layer processing unit configured to configure a control resource set for a terminal apparatus; and a transmitter configured to transmit the PDCCH by using a PDCCH candidate in the control resource set, where the control resource set is configured for a listen-before-talk (LBT) subband in a bandwidth part (BWP) of the terminal apparatus.

In the third implementation of the present disclosure, further, in each of a plurality of control resource sets, the PDCCH is transmitted that includes control information indicating a subframe configuration of the LBT subband.

In the third implementation of the present disclosure, further, each of the plurality of control resource sets is configured by using multiple resource blocks in the LBT subband corresponding to the control resource set.

A fourth implementation of the present disclosure is a communication method used in a base station apparatus for transmitting a physical downlink control channel (PDCCH), the communication method including: configuring a control resource set for a terminal apparatus; and transmitting the PDCCH by using a PDCCH candidate in the control resource set. The control resource set is configured for a listen-before-talk (LBT) subband (LBT grid) in a bandwidth part (BWP) of the terminal apparatus.

In the fourth implementation of the present disclosure, further, in each of a plurality of control resource sets, the PDCCH is transmitted that includes control information indicating a subframe configuration of the LBT subband corresponding to the control resource set.

In the fourth implementation of the present disclosure, further, each of the plurality of control resource sets is configured by using multiple resource blocks in the LBT subband corresponding to the control resource set.

Advantageous Effects

According to one implementation of the present disclosure, the terminal apparatus can efficiently perform wideband communication. In addition, the base station apparatus can efficiently perform wideband communication.

DESCRIPTION

Embodiments of the present disclosure will be described below.

Figure 1:
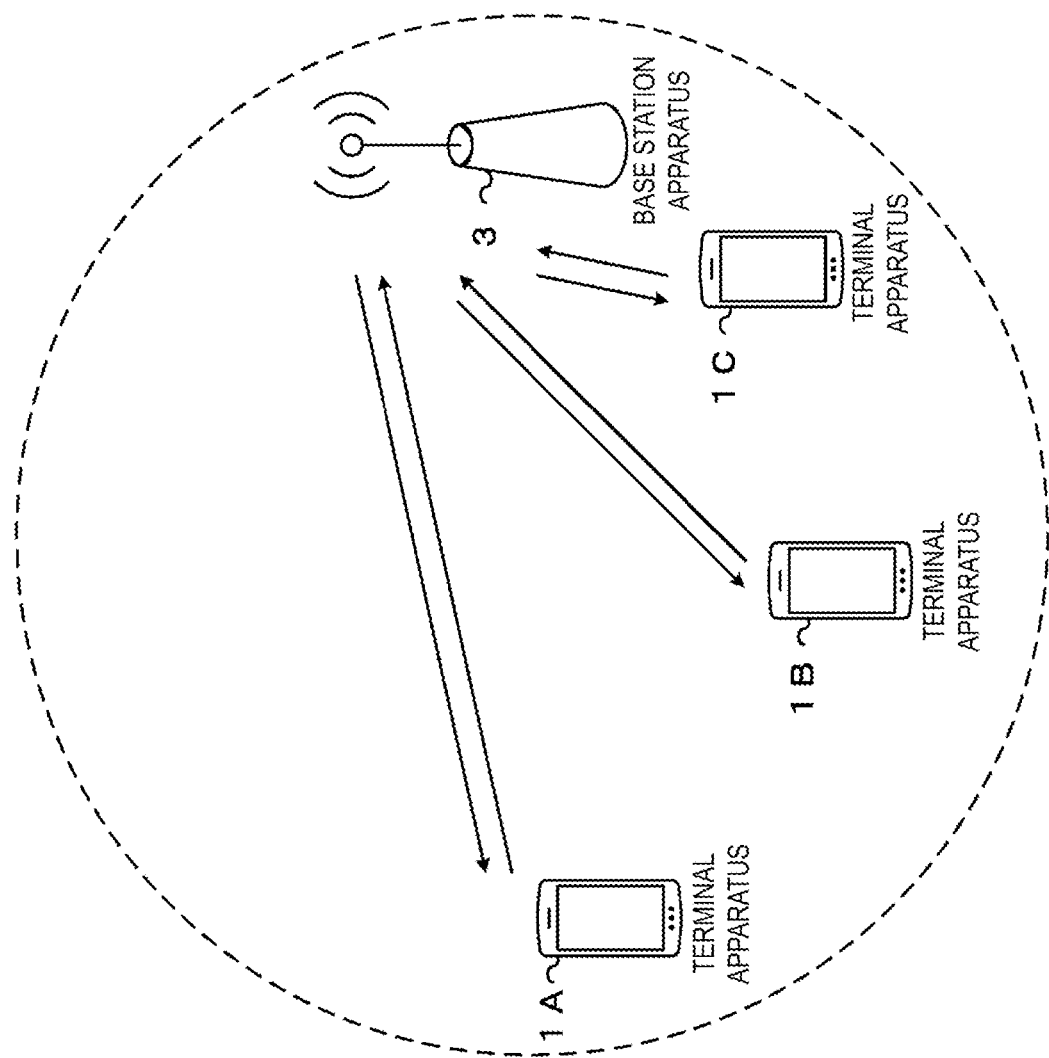
FIG. 1 is a conceptual diagram of a radio communication system according to one implementation of the present disclosure.

FIG. 1 is a conceptual diagram of a radio communication system according to one implementation of the present disclosure. In FIG. 1, the radio communication system includes terminal apparatuses 1A to 1C and a base station apparatus 3 (Next Generation NodeB(gNB)). Hereinafter, the terminal apparatuses 1A to 1C are each also referred to as a terminal apparatus 1 or user equipment (UE).

Hereinafter, various radio parameters related to communications between the terminal apparatus 1 and the base station apparatus 3 will be described. Here, at least some of the radio parameters (for example, Subcarrier Spacing (SCS)) are also referred to as Numerology. The radio parameters include at least some of the sub carrier spacing, a length of an Orthogonal Frequency Division Multiplexing (OFDM) symbol, a length of a subframe, a length of a slot, or a length of a mini-slot.

The subcarrier spacing used for the radio communications is one of the radio parameters for the communication method (for example, OFDM, Orthogonal Frequency Division Multiple Access (OFDMA), Single Carrier-Frequency Division Multiple Access (SC-FDMA), Discrete Fourier Transform-spread-OFDM (DFT-s-OFDM) used for radio communication between the terminal apparatus 1 and the base station apparatus 3. For example, the subcarrier spacing is 15 kHz, 30 kHz, 60 kHz, or 120 kHz.

Figure 2:
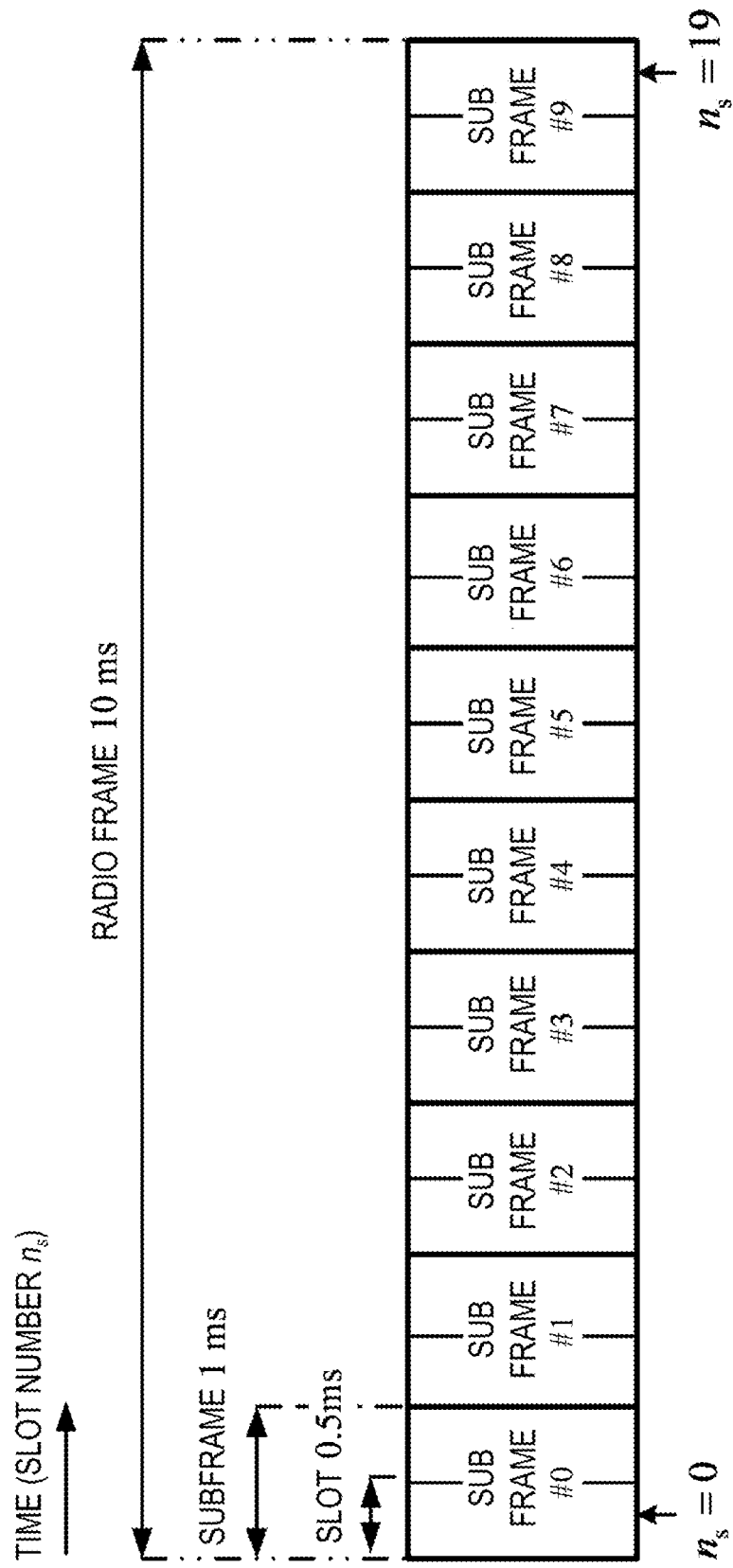
FIG. 2 is an example illustrating a configuration of a radio frame, subframes, and slots according to one implementation of the present disclosure.

FIG. 2 is an example illustrating a configuration of a radio frame, subframes, and slots according to one implementation of the present disclosure. In the example illustrated in FIG. 2, a length of each slot is 0.5 ms, a length of each subframe is 1 ms, and a length of the radio frame is 10 ms. The slot may be a unit of resource allocation in the time domain. For example, the slot may be a unit for mapping of one transport block. For example, the transport block may be mapped to one slot. Here, the transport block may be a unit of data to be transmitted in a prescribed interval (for example, Transmission Time Interval (TTI)) defined in a higher layer (for example, Medium Access Control (MAC) or RRC (Radio Resource Control)).

For example, the length of the slot may be given according to the number of OFDM symbols. For example, the number of OFDM symbols may be 7 or 14. The length of the slot may be given based on at least a length of an OFDM symbol. The length of the OFDM symbol may differ based on at least the subcarrier spacing. The length of the OFDM symbol may be given based on at least the number of points of Fast Fourier Transform (FFT) used to generate the OFDM symbol. The length of the OFDM symbol may include a length of a Cyclic Prefix (CP) added to the OFDM symbol. Here, the OFDM symbol may be called a symbol. In addition, in a case that a communication scheme other than OFDM is used in communication between the terminal apparatus 1 and the base station apparatus 3 (e.g., in a case that SC-FDMA or DFT-s-OFDM is used, etc.), a SC-FDMA symbol and/or a DFT-s-OFDM symbol to be generated is also referred to as an OFDM symbol. Moreover, unless otherwise stated, OFDM includes SC-FDMA or DFT-s-OFDM.

For example, the length of a slot may be 0.125 ms, 0.25 ms, 0.5 ms, or 1 ms. For example, in a case that the subcarrier spacing is 15 kHz, the length of the slot may be 1 ms. For example, in a case that the subcarrier spacing is 30 kHz, the length of the slot may be 0.5 ms. For example, in a case that the subcarrier spacing is 120 kHz, the length of the slot may be 0.125 ms. For example, in a case that the subcarrier spacing is 15 kHz, the length of the slot may be 1 ms. For example, in a case that the length of the slot is 0.125 ms, one subframe may include eight slots. For example, in a case that the length of the slot is 0.25 ms, one subframe may include four slots. For example, in a case that the length of the slot is 0.5 ms, one subframe may include two slots. For example, in a case that the length of the slot is 1 ms, one subframe may include one slot.

The OFDM includes a multi-carrier communication scheme in which waveform shaping (Pulse Shape), Peak-to-Average power Ratio (PAPR) reduction, out-of-band radiation reduction, or filtering, and/or phase processing (e.g., phase rotation, etc.) are applied. The multi-carrier communication scheme may be a communication scheme for generating/transmitting a signal in which multiple sub-carriers are multiplexed.

The radio frame may be given according to the number of subframes. The number of subframes for the radio frame may be, for example, 10. The radio frame may be given according to the number of slots.

Figure 3:
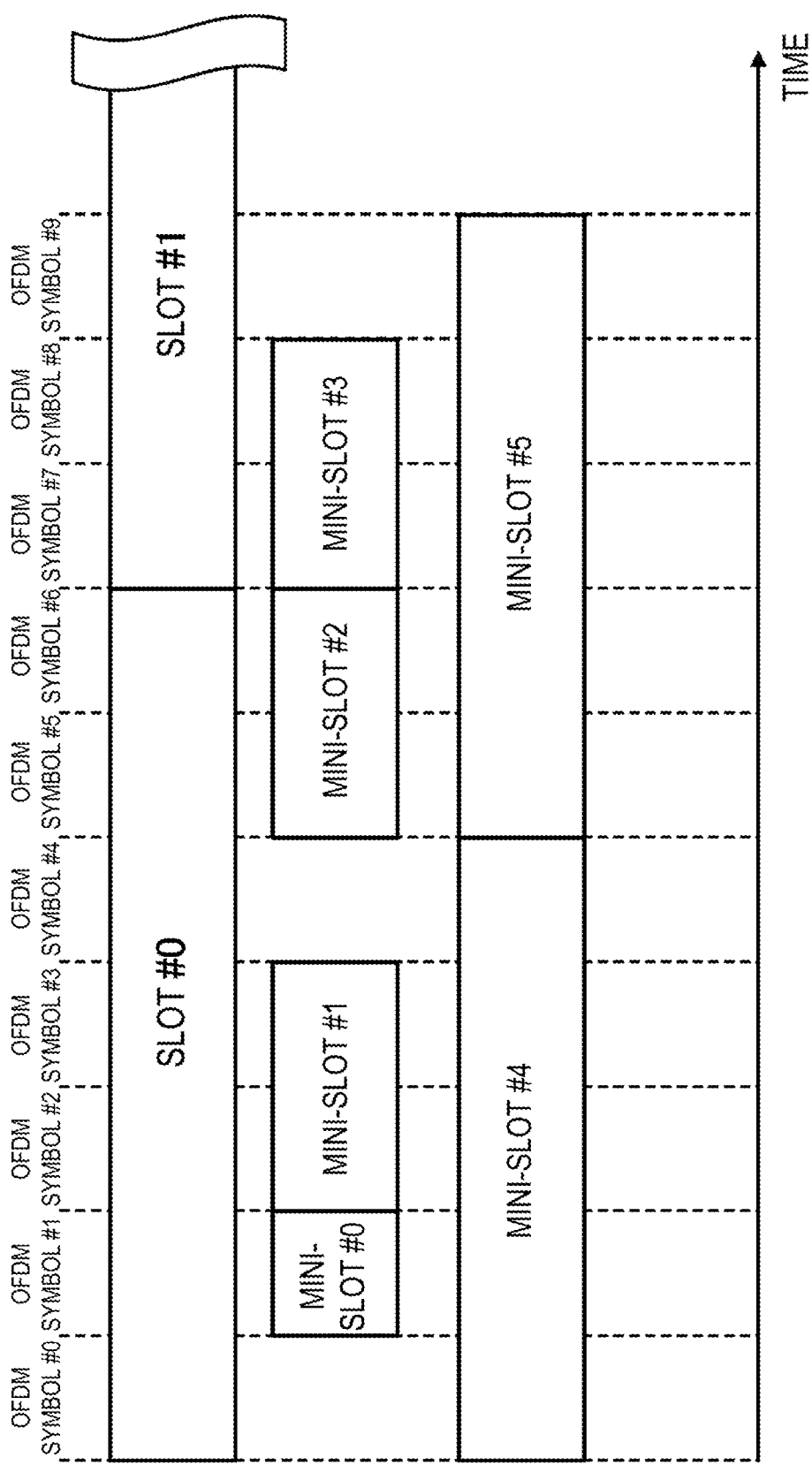
FIG. 3 is a diagram illustrating a configuration of the slots and mini-slots according to one implementation of the present disclosure.

FIG. 3 is a diagram illustrating a configuration example of the slots and mini-slots according to the one implementation of the present disclosure. In FIG. 3, the number of OFDM symbols comprising a single slot is seven. The mini-slot may include one or more OFDM symbols less than the number of multiple OFDM symbols comprising the slot. The length of the mini-slot may be shorter than that of the slot. FIG. 3 illustrates a mini-slot #0 to a mini-slot #5 as an example of the configuration of the mini-slots. The mini-slot may include a single OFDM symbol, as indicated by the mini-slot #0. The mini-slot may include two OFDM symbols as indicated by the mini-slots #1 to #3. Moreover, a gap (time interval) may be inserted between two mini-slots, as indicated by the mini-slots #1 and #2. Moreover, the mini-slot may be configured so as to cross the boundary between the slots #0 and #1, as indicated by the mini-slot #5. In other words, the mini-slot may be configured so as to cross the boundary between the slots. Here, the mini-slot is also referred to as a sub-slot. The mini-slot is also referred to as short TTI (sTTI). Moreover, in the following, the slot may be replaced by the mini-slot. The mini-slot may include the same number of OFDM symbols as that of the slot. The mini-slot may include OFDM symbols more than the number of multiple OFDM symbols comprising the slot. The length of the time domain of the mini-slot may be shorter than the length of the slot. The length of the time domain of the mini-slot may be shorter than the length of the subframe.

A physical channel and a physical signal according to various implementations of the present disclosure will be described below.

In FIG. 1, at least the following uplink physical channels are used for uplink radio communication from the terminal apparatus 1 to the base station apparatus 3. The uplink physical channels are used by a physical layer for transmission and/or reception of information output from a higher layer.

Physical Uplink Control Channel (PUCCH)
Physical Uplink Shared Channel (PUSCH)
Physical Random Access Channel (PRACH)

The PUCCH is used to transmit and/or receive Uplink Control Information (UCI). The uplink control information includes Channel State Information (CSI) of downlink channel, a Scheduling Request (SR) used to request a PUSCH (Uplink-Shared Channel (UL-SCH)) resource for initial transmission, and a Hybrid Automatic Repeat Request Acknowledgement (HARQ-ACK) for downlink data (Transport block (TB), MAC Protocol Data Unit (MAC PDU), Downlink-Shared Channel (DL-SCH), and Physical Downlink Shared Channel (PDSCH)). The HARQ-ACK indicates an acknowledgement (ACK) or a negative-acknowledgement (NACK). The HARQ-ACK is also referred to as HARQ feedback, HARQ information, HARQ control information, and an ACK/NACK.

The CSI includes at least a Channel Quality Indicator (CQI). The channel state information may include a Rank Indicator (RI). The channel state information may include a Precoder Matrix Indicator (PMI). The CQI is an indicator associated with channel quality (propagation strength), and the PMI is an indicator indicating a precoder. The RI is an indicator indicating a transmission rank (or the number of transmission layers).

The PUSCH is used to transmit and/or receive uplink data (TB, MAC PDU, UL-SCH, and PUSCH). The PUSCH may be used to transmit and/or receive a HARQ-ACK and/or channel state information along with the uplink data. Further, the PUSCH may be used to transmit and/or receive only the channel state information or only the HARQ-ACK and the channel state information. The PUSCH is used to transmit and/or receive a random access message 3.

The PRACH may be used to transmit and/or receive a random access preamble (random access message 1). The PRACH is used to indicate an initial connection establishment procedure, a handover procedure, a connection re-establishment procedure, synchronization (timing adjustment) for uplink data transmission, and a request for a PUSCH (UL-SCH) resource. The random access preamble may be used to notify the base station apparatus 3 of an index (random access preamble index) given by a higher layer of the terminal apparatus 1.

The random access preamble may be given by cyclic-shifting a Zadoff-Chu sequence corresponding to a physical root sequence index u. The Zadoff-Chu sequence may be generated based on the physical root sequence index u. In a single cell, multiple random access preambles may be defined. A random access preamble may be identified at least based on an index of the random access preamble. A different random access preamble corresponding to a different index of the random access preamble may correspond to a different combination of the physical root sequence index u and the cyclic shift. The physical root sequence index u and the cyclic shift may be given at least based on information included in system information. The physical root sequence index u may be an index for identifying a sequence included in the random access preamble. The random access preamble may be identified at least based on the physical root sequence index u.

In FIG. 1, the following uplink physical signals are used for uplink radio communication. The uplink physical signals may not be used for transmitting and/or receiving information output from a higher layer, but is used by the physical layer.

Uplink Reference Signal (UL RS)

According to the present disclosure, at least the following two types of uplink reference signal may be used.

Demodulation Reference Signal (DMRS)
Sounding Reference Signal (SRS)

The DMRS is associated with transmission and/or reception of a PUSCH and/or a PUCCH. The DMRS is multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH. Reception of both of the PUSCH and the DMRS is hereinafter referred to simply as reception of the PUSCH. Reception of both of the PUCCH and the DMRS is hereinafter referred to simply as reception of the PUCCH.

The SRS may not be associated with transmission and/or reception of the PUSCH or the PUCCH. The base station apparatus 3 may use the SRS for measuring a channel state. The SRS may be transmitted and/or received at the end of a subframe in an uplink slot or in a prescribed number of OFDM symbols from the end.

In FIG. 1, the following downlink physical channels are used for downlink radio communication from the base station apparatus 3 to the terminal apparatus 1. The downlink physical channels are used by the physical layer for transmission and/or reception of information output from a higher layer.

Physical Broadcast Channel (PBCH)
PDCCH
PDSCH

The PBCH is used for broadcasting a Master Information Block (MIB or Broadcast Channel (BCH)) that is commonly used by the terminal apparatuses 1. The PBCH may be transmitted at a prescribed transmission interval. For example, the PBCH may be transmitted at an interval of 80 ms. Contents of information included in the PBCH may be updated at every 80 ms. The PBCH may include 288 subcarriers. The PBCH may include two, three, or four OFDM symbols. The MIB may include information related to an identifier (index) that is related to a synchronization signal. The MIB may include information indicating at least some of numbers of a slot, a subframe, and a radio frame in which a PBCH is transmitted.

The PDCCH (NR PDCCH) is used to transmit and/or receive Downlink Control Information (DCI). The downlink control information is also called a DCI format. The downlink control information may include at least either a downlink grant or an uplink grant. The downlink grant is also referred to as downlink assignment or downlink allocation. The downlink control information may include Unlicensed access common information. The Unlicensed access common information is control information related to access, transmission and/or reception, or the like in the frequency band that does not require license. The Unlicensed access common information may be information of a downlink subframe configuration (Subframe configuration for Unlicensed Access). The downlink subframe configuration indicates positions of the OFDM symbols occupied in the subframe to which the PDCCH including information of the downlink subframe configuration is mapped and/or positions of the OFDM symbol occupied in the subframe next to the subframe to which the PDCCH including the information of the downlink subframe configuration is mapped. In the occupied OFDM symbols, transmission and/or reception of a downlink physical channel and a downlink physical signal is performed. The Unlicensed access common information may be information of an uplink subframe configuration (UL duration and offset). The uplink subframe configuration indicates a position of a subframe at which an uplink subframe is started with a reference subframe being a subframe to which the PDCCH including information of the uplink subframe configuration is mapped, and the number of subframes of the uplink subframes. The terminal apparatus 1 is not required to receive a downlink physical channel and a downlink physical signal in the subframe indicated by the information of the uplink subframe configuration.

For example, the downlink control information including the downlink grant or the uplink grant is transmitted and/or received in the PDCCH by including a Cell-Radio Network Temporary Identifier (C-RNTI). For example, the Unlicensed access common information is transmitted and/or received in the PDCCH by including a Common Control-Radio Network Temporary Identifier (CC-RNTI).

A single downlink grant is at least used for scheduling of a single PDSCH in a single serving cell. The downlink grant is at least used for the scheduling of the PDSCH in the same slot as the slot in which the downlink grant is transmitted. The downlink grant may be used for scheduling of the PDSCH within a different slot from the slot in which the downlink grant has been transmitted.

A single uplink grant is at least used for scheduling of a single PUSCH in a single serving cell.

In the terminal apparatus 1, one or multiple control resource sets (CORESETs) may be configured to search for a PDCCH. The terminal apparatus 1 attempts to receive the PDCCH in the configured control resource set. Details of the control resource set will be described later.

The PDSCH is used to transmit and/or receive downlink data (DL-SCH, PDSCH). The PDSCH is at least used to transmit and/or receive a random access message 2 (random access response). The PDSCH is at least used to transmit and/or receive system information including parameters used for initial access.

In FIG. 1, the following downlink physical signals are used for the downlink radio communication. The downlink physical signals may not be used for transmitting and/or receiving information output from a higher layer, but is used by the physical layer.

Synchronization Signal (SS)
Downlink Reference Signal (DL RS)

The synchronization signal is used for the terminal apparatus 1 to establish synchronization in a frequency domain and a time domain in the downlink. The synchronization signal includes a Primary Synchronization Signal (PSS) and a Secondary Synchronization Signal (SSS).

The downlink reference signal is used for the terminal apparatus 1 to perform channel compensation on a downlink physical channel. The downlink reference signal is used for the terminal apparatus 1 to obtain the downlink channel state information.

According to the present disclosure, at least the following type of downlink reference signal is used.

DMRS

The DMRS corresponds to transmission and/or reception of the PDCCH and/or the PDSCH. The DMRS is multiplexed with the PDCCH or the PDSCH. The terminal apparatuses 1 may use the DMRS corresponding to the PDCCH or the PDSCH in order to perform channel compensation of the PDCCH or the PDSCH. Hereinafter, transmission of both of the PDCCH and the DMRS corresponding to the PDCCH is simply referred to as transmission of the PDCCH. Hereinafter, transmission and/or reception of both of the PDCCH and the DMRS corresponding to the PDCCH is simply referred to as transmission and/or reception of the PDCCH. Hereinafter, transmission of both of the PDSCH and the DMRS corresponding to the PDSCH is simply referred to as transmission of the PDSCH. Hereinafter, reception of both of the PDSCH and the DMRS corresponding to the PDSCH is simply referred to as reception of the PDSCH.

The DMRS may be an RS individually configured for the terminal apparatus 1. The sequence of the DMRS may be given at least based on parameters individually configured for the terminal apparatus 1. The DMRS may be individually transmitted for the PDCCH and/or the PDSCH. The DMRS may be an RS configured common to the multiple terminal apparatuses 1. The sequence of the DMRS may be given regardless of the parameter individually configured for the terminal apparatus 1. For example, the sequence of the DMRS may be given based on at least some of a slot number, a mini-slot number, and a cell identity (ID). The DMRS may be an RS to be transmitted regardless of whether the PDCCH and/or the PDSCH has been transmitted.

Downlink physical channels and downlink physical signals are collectively referred to as downlink signals. Uplink physical channels and uplink physical signals are collectively referred to as uplink signals. The downlink physical channels and the uplink physical channels are collectively referred to as physical channels. The downlink physical signals and the uplink physical signals are collectively referred to as physical signals.

The BCH, the UL-SCH, and the DL-SCH are transport channels. A channel used in a MAC layer is referred to as a transport channel. A unit of the transport channel used in the MAC layer is also referred to as a transport block or a MAC PDU. A HARQ is controlled for each transport block in the MAC layer. The transport block is a unit of data that the MAC layer delivers to the physical layer. In the physical layer, the transport block is mapped to a codeword, and a modulation process is performed for each codeword.

The base station apparatus 3 and the terminal apparatus 1 exchange (transmit and/or receive) a signal in the higher layer. For example, the base station apparatus 3 and the terminal apparatus 1 may transmit and/or receive Radio Resource Control (RRC) signaling (also referred to as a Radio Resource Control (RRC) message or Radio Resource Control (RRC) information) in an RRC layer. Furthermore, the base station apparatus 3 and the terminal apparatus 1 may transmit and/or receive, in the MAC layer, a MAC Control Element (CE). Here, the RRC signaling and/or the MAC CE is also referred to as higher layer signaling.

The PUSCH and the PDSCH are at least used to transmit and/or receive the RRC signaling and the MAC CE. Here, the RRC signaling transmitted from the base station apparatus 3 through the PDSCH may be signaling common to the multiple terminal apparatuses 1 in a cell. The signaling common to the multiple terminal apparatuses 1 in the cell is also referred to as common RRC signaling. The RRC signaling transmitted from the base station apparatus 3 through the PDSCH may be signaling dedicated to a certain terminal apparatus 1 (also referred to as dedicated signaling or UE specific signaling). The signaling dedicated to the terminal apparatus 1 is also referred to as dedicated RRC signaling. A cell-specific parameter may be transmitted by using the signaling common to the multiple terminal apparatuses 1 in the cell or the signaling dedicated to the certain terminal apparatus 1. A UE-specific parameter may be transmitted by using the signaling dedicated to the certain terminal apparatus 1. The PDSCH including the dedicated RRC signaling may be scheduled via the PDCCH in the control resource set. The PDSCH including the common RRC signaling may be scheduled via the PDCCH in the control resource set.

A Broadcast Control CHannel (BCCH), a Common Control CHannel (CCCH), and a Dedicated Control Channel (DCCH) are logical channels. For example, the BCCH is a higher layer channel used to transmit the MIB. Furthermore, the CCCH is a higher layer channel used to transmit and/or receive information common to the multiple terminal apparatuses 1. Here, the CCCH is used for a terminal apparatus 1 that is not in an RRC connected state, for example. Furthermore, the DCCH is a channel of the higher layer used to transmit and/or receive individual control information (dedicated control information) to the terminal apparatus 1. Here, the DCCH is used for a terminal apparatus 1 that is in the RRC connected state, for example.

The BCCH in the logical channel may be mapped to the BCH, the DL-SCH, or the UL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel is mapped to the PUSCH in the physical channel. The DL-SCH in the transport channel is mapped to the PDSCH in the physical channel. The BCH in the transport channel is mapped to the PBCH in the physical channel.

Hereinafter, the control resource set will be described.

Figure 4:
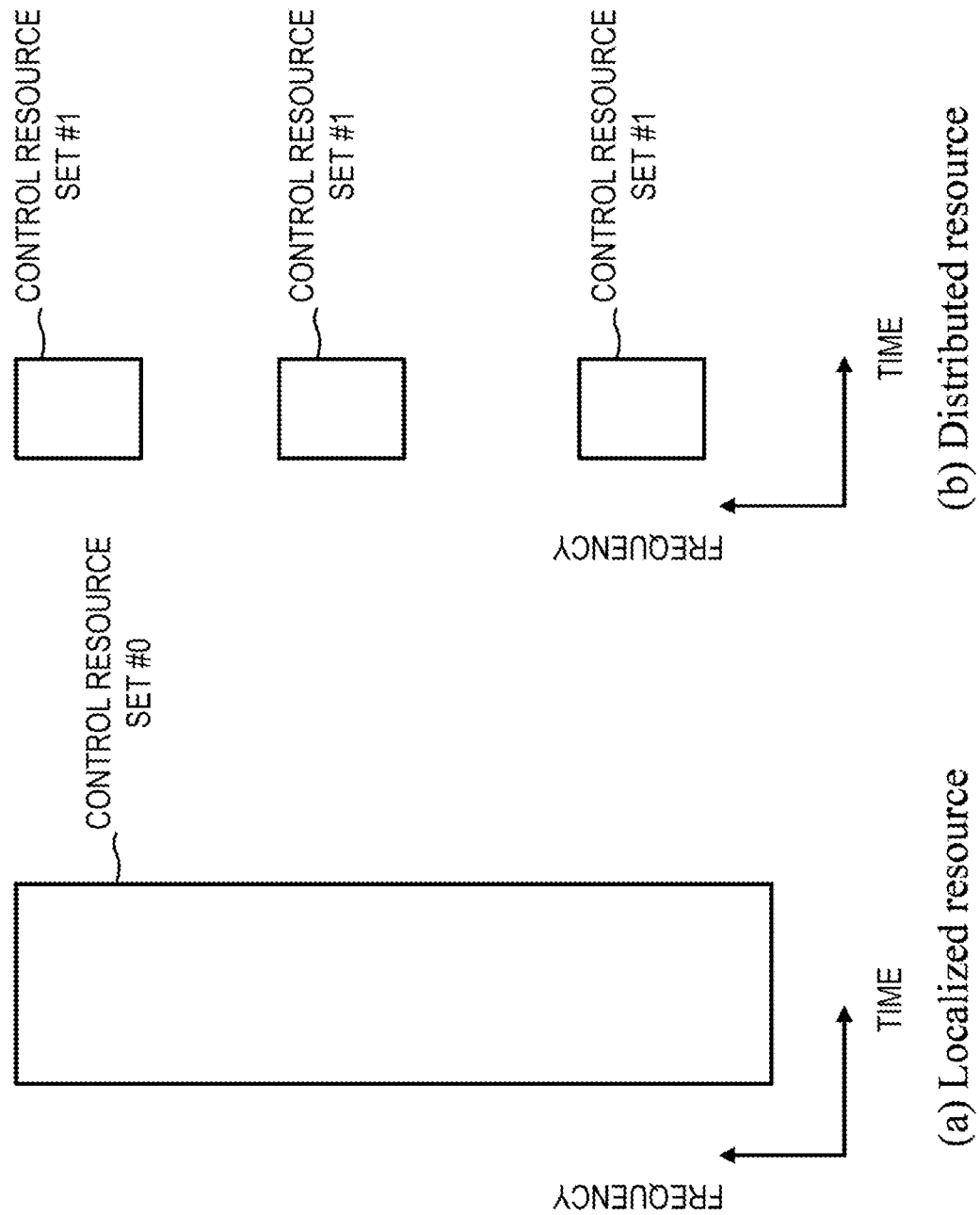
FIG. 4 is a diagram illustrating an example of mapping control resource sets according to one implementation of the present disclosure.

FIG. 4 is a diagram illustrating an example of mapping of control resource sets according to the one implementation of the present disclosure. The control resource set may be a time frequency domain in which one or multiple control channels may be mapped. The control resource set may be a region in which the terminal apparatus 1 attempts to receive and/or detect (perform blind detection of (perform blind decoding (BD) of)) the PDCCH. As illustrated in FIG. 4(a), the control resource set may include continuous resources (Localized resource) in the frequency domain. Further, as illustrated in FIG. 4(b), the control resource set may include non-continuous resources (distributed resources) in the frequency domain.

In the frequency domain, the unit of mapping the control resource set may be a resource block. The control resource set may include multiple resource blocks. In the time domain, the unit of mapping the control resource set may be an OFDM symbol. The control resource set may include one, two, or three OFDM symbols.

The frequency domain of the control resource set may be identical to the system bandwidth of a serving cell. In addition, the frequency domain of the control resource set may be given at least based on the system bandwidth of the serving cell. The frequency domain of the control resource set may be given at least based on higher layer signaling or system information. For example, the position of each resource block comprising the control resource set is reported from the base station apparatus 3 to the terminal apparatus 1 by using higher layer signaling. For each control resource, the position of each resource block comprising the control resource set is reported from the base station apparatus 3 to the terminal apparatus 1 by using higher layer signaling.

The time domain of the control resource set may be given at least based on higher layer signaling or system information. For example, the number of OFDM symbols comprising the control resource set is reported from the base station apparatus 3 to the terminal apparatus 1 by using higher layer signaling. For example, the start position of the OFDM symbol comprising the control resource set is reported from the base station apparatus 3 to the terminal apparatus 1 by using higher layer signaling. For example, the end position of the OFDM symbol comprising the control resource set is reported from the base station apparatus 3 to the terminal apparatus 1 by using higher layer signaling. For example, the position of the subframe at which the control resource set is mapped is reported from the base station apparatus 3 to the terminal apparatus 1 by using higher layer signaling. For example, the position of the slot at which the control resource set is mapped is reported from the base station apparatus 3 to the terminal apparatus 1 by using higher layer signaling. For example, periodicity of the subframe to which the control resource set is mapped is reported from the base station apparatus 3 to the terminal apparatus 1 by using higher layer signaling. For example, periodicity of the slot to which the control resource set is mapped is reported from the base station apparatus 3 to the terminal apparatus 1 by using higher layer signaling.

For the control resource set, one of or both of types of a Common control resource set (Common CORESET) and a Dedicated control resource set (UE specific CORESET) may be used. The common control resource set may be a control resource set configured commonly to multiple terminal apparatuses 1. The common control resource set may be given at least based on a synchronization signal, an MIB, first system information, second system information, common RRC signaling, dedicated RRC signaling, a cell ID, or the like. For example, the position of the subframe at which the common control resource set is mapped may be given at least based on a synchronization signal, an MIB, common RRC signaling, or the like. The dedicated control resource set may be a control resource set configured to be dedicatedly used for each individual terminal apparatus 1. The dedicated control resource set may be given at least based on dedicated RRC signaling and/or a value of a C-RNTI.

The control resource set may be a set of control channels (or control channel candidates) to be monitored by the terminal apparatus 1. The control resource set may include a set of control channels (or control channel candidates) to be monitored by the terminal apparatus 1. The control resource set may include one or multiple Search Spaces (SSs).

The search space includes one or multiple PDCCH candidates. The terminal apparatus 1 receives a PDCCH candidate included in the search space and attempts to receive a PDCCH. Here, the PDCCH candidate is also referred to as a blind detection candidate.

The search space includes two types, that is, a Common Search Space (CSS) and a UE-specific Search Space (USS). The CSS may be a search space configured commonly to multiple terminal apparatuses 1. The USS may be a search space including a configuration to be dedicatedly used for each individual terminal apparatus 1. The CSS may be given at least based on a synchronization signal, an MIB, first system information, second system information, common RRC signaling, dedicated RRC signaling, a cell ID, or the like. The USS may be given at least based on dedicated RRC signaling and/or a value of a C-RNTI.

For the CSS, a type 0 PDCCH CSS for a DCI format that is scrambled with a System Information-RNTI (SI-RNTI) used for transmission of system information in a primary cell and a type1-PDCCH CSS for a DCI format that is scrambled with an Interruption-RNTI (INT-RNTI) used for initial access in the primary cell may be used. For the CSS, a PDCCH CSS of a type for a DCI format that is scrambled with a CC-RNTI used for Unlicensed access may be used. The terminal apparatus 1 can monitor PDCCH candidates in those search spaces. The DCI format that is scrambled with a prescribed RNTI may be a DCI format to which a Cyclic Redundancy Check (CRC) scrambled with the prescribed RNTI is added.

Note that the PDCCH and/or the DCI included in the CSS need not include a Carrier Indicator Field (CIF) that indicates correspondence between the PDCCH/DCI and its scheduling target of the PDSCH or the PUSCH for a certain serving cell (or a certain component carrier).

Note that, in a case that carrier aggregation in which multiple serving cells and/or multiple component carriers are aggregated to perform communication (transmission and/or reception) with the terminal apparatus 1 is configured, the PDCCH and/or the DCI included in the USS for a prescribed serving cell (prescribed component carrier) includes the CIF that indicates correspondence between the PDCCH/DCI and its scheduling target of the PDSCH or the PUSCH for a certain serving cell and/or a certain component carrier.

Note that, in a case that communication is performed by using a single serving cell and/or a single component carrier for the terminal apparatus 1, the PDCCH and/or the DCI included in the USS need not include the CIF that indicates correspondence between the PDCCH/DCI and its scheduling target of the PDSCH or the PUSCH for a certain serving cell and/or a certain component carrier.

The common control resource set may include the CSS. The common control resource set may include both of the CSS and the USS. The dedicated control resource set may include the USS. The dedicated control resource set may include the CSS.

In the common control resource set, the PDCCH including control information necessary for Unlicensed access (Unlicensed access common information) may be transmitted and/or received. In the common control resource set, the PDCCH including resource allocation information of the PDSCH including Remaining Minimum System Information (RMSI) may be transmitted and/or received. In the common control resource set, the PDCCH including resource allocation information of the PDSCH including a Random Access Response (RAR) may be transmitted and/or received. In the common control resource set, the PDCCH including control information indicating Pre-emption resources may be transmitted and/or received. In the common control resource set, the PDCCH including control information indicating a slot format indicator may be transmitted and/or received. Note that multiple common control resource sets may be configured, and each of the common control resource sets may be mapped to a different subframe. Note that multiple common control resource sets may be configured, and each of the common control resource sets may be mapped to the same subframe. Note that multiple common control resource sets may be configured, and a different PDCCH or different control information may be mapped to each of the common control resource sets.

Multiple dedicated control resource sets may be configured in a subframe. Multiple dedicated control resource sets may be configured, and each of the dedicated control resource sets may be mapped to the same subframe. Multiple dedicated control resource sets may be configured, and each of the dedicated control resource sets may be mapped to a different subframe.

A physical resource of the search space includes a control channel element (CCE) of the control channel. The CCE includes a prescribed number of REGs. For example, the CCE may include six REGs. An REG may include a single OFDM symbol of a single Physical Resource Block (PRB). In other words, the REG may include 12 Resource Elements (REs). The PRB is also simply referred to as a Resource Block (RB).

In other words, the terminal apparatus 1 can detect the PDCCH and/or the DCI for the terminal apparatus 1 by performing blind detection of the PDCCH candidates included in the search space in the control resource set.

The number of times of the blind detection to be performed on a single control resource set in a single serving cell and/or a single component carrier may be determined based on a type of the search space, a type of an aggregation level, or the number of PDCCH candidates for the PDCCH included in the control resource set. Here, the type of the search space may include at least one of a CSS and/or a USS and/or a UE Group SS (UGSS) and/or a Group CSS (GCSS). The type of the aggregation level may indicate a maximum aggregation level supported for the CCE comprising the search space, and may be defined/configured based on at least one of $\{1, 2, 4, 8, \ldots, X\}$ (X is a prescribed value). The number of PDCCH candidates may indicate the number of PDCCH candidates for a certain aggregation level. In other words, the number of PDCCH candidates may be defined/configured for each of multiple aggregation levels. Note that the UGSS may be a search space assigned commonly to one or multiple terminal apparatuses 1. The GCSS may be a search space in which DCI including a parameter related to the CSS is mapped to one or multiple terminal apparatuses 1. Note that the aggregation level indicates an aggregation level of a prescribed number of CCEs, and relates to a total number of CCEs comprising a single PDCCH and/or search space.

Note that the value of the aggregation level may be associated with coverage corresponding to the PDCCH and/or the search space or the size of the DCI (DCI format size, payload size) included in the PDCCH and/or the search space.

Note that, in a case that the start position (start symbol) of the PDCCH symbol is configured for a single control resource set and more than one PDCCH can be detected in the control resource set in a prescribed period, each of the type of the search space, the type of the aggregation level, and the number of PDCCH candidates for the PDCCH included in the control resource set may be configured for the time domain corresponding to each start symbol. Each of the type of the search space, the type of the aggregation level, and the number of PDCCH candidates for the PDCCH included in the control resource set may be configured for each control resource set, may be provided/configured by using DCI and/or higher layer signaling, or may be defined/configured in a specification in advance. Note that the number of PDCCH candidates may be the number of PDCCH candidates in a prescribed period. Note that the prescribed period may be 1 ms. The prescribed period may be 1 microsecond. Alternatively, the prescribed period may be a period of one slot. Alternatively, the prescribed period may be a period of one OFDM symbol.

Note that, in a case that there is more than one start position (start symbol) of the PDCCH symbol for a single control resource set, that is, there are multiple timings for performing blind detection (monitoring) of the PDCCH in a prescribed period, each of the type of the search space, the type of the aggregation level, and the number of PDCCH candidates for the PDCCH included in the control resource set may be configured for the time domain corresponding to each start symbol. Each of the type of the search space, the type of the aggregation level, and the number of PDCCH candidates for the PDCCH included in the control resource set may be configured for each control resource set, may be provided/configured by using DCI and/or higher layer signaling, or may be defined/configured in a specification in advance.

Note that, as a configuration used to indicate the number of PDCCH candidates, the number to be reduced from a prescribed number of PDCCH candidates may be defined/configured for each aggregation level.

The terminal apparatus 1 may transmit/report capability information related to blind detection to the base station apparatus 3. The terminal apparatus 1 may transmit/report the number of PDCCH candidates that can be processed in a single subframe to the base station apparatus 3 as capability information related to the PDCCH. In a case that a larger number of control resource sets than a prescribed number can be configured for one or multiple serving cells/component carriers, the terminal apparatus 1 may transmit/report the capability information related to blind detection to the base station apparatus 3.

In a case that the terminal apparatus 1 supports a first slot format and a second slot format, the terminal apparatus 1 may transmit/report capability information related to the slot format to the base station apparatus 3.

In a case that a larger number of control resource sets than a prescribed number can be configured for one or multiple serving cells/component carriers, the terminal apparatus 1 may transmit/report the capability information related to blind detection to the base station apparatus 3.

Note that the capability information related to blind detection may include information indicating a maximum number of times of the blind detection in a prescribed period. Further, the capability information related to blind detection may include information indicating that the number of PDCCH candidates can be reduced. Further, the capability information related to blind detection may include information indicating a maximum number of control resource sets that can be subjected to the blind detection in a prescribed period. The maximum number of control resource sets and the maximum number of serving cells and/or component carriers in which the PDCCH can be monitored may each be configured as an individual parameter, or may be configured as a common parameter. Further, the capability information related to blind detection may include information indicating a maximum number of control resource sets that can be simultaneously subjected to the blind detection in a prescribed period.

In a case that the terminal apparatus 1 does not support detecting (performing blind detection of) a larger number of control resource sets than a prescribed number in a prescribed period, the terminal apparatus 1 need not transmit/report the capability information related to blind detection. In a case that the base station apparatus 3 does not receive the capability information related to blind detection, the base station apparatus 3 may transmit the PDCCH by implementing a configuration related to the control resource set so that the number of control resource sets do not exceed a prescribed number for the blind detection.

The configuration related to the control resource set may include a parameter indicating a start position (start symbol)

of the PDCCH. Further, the configuration related to the control resource set may include a parameter indicating a time resource region of the control resource set (the number of OFDM symbols comprising the control resource set, the position of the subframe in which the control resource set is mapped). Further, the configuration related to the control resource set may include a parameter indicating a frequency resource region of the control resource set (the number of resource blocks comprising the control resource set). Further, the configuration related to the control resource set may include a parameter indicating a type of mapping from the CCE to the REG. Further, the configuration related to the control resource set may include a REG bundle size. Further, the configuration related to the control resource set may include a parameter indicating a CCE aggregation level of the USS. Further, the configuration related to the control resource set may include a parameter indicating periodicity for monitoring the PDCCH and/or the control resource set (periodicity of the subframe, the start position of the subframe). The maximum number of blind detections of the PDCCH may be individually configured according to the start position of the PDCCH.

The unit of the physical resource according to the present disclosure will be described below.

Figure 5:
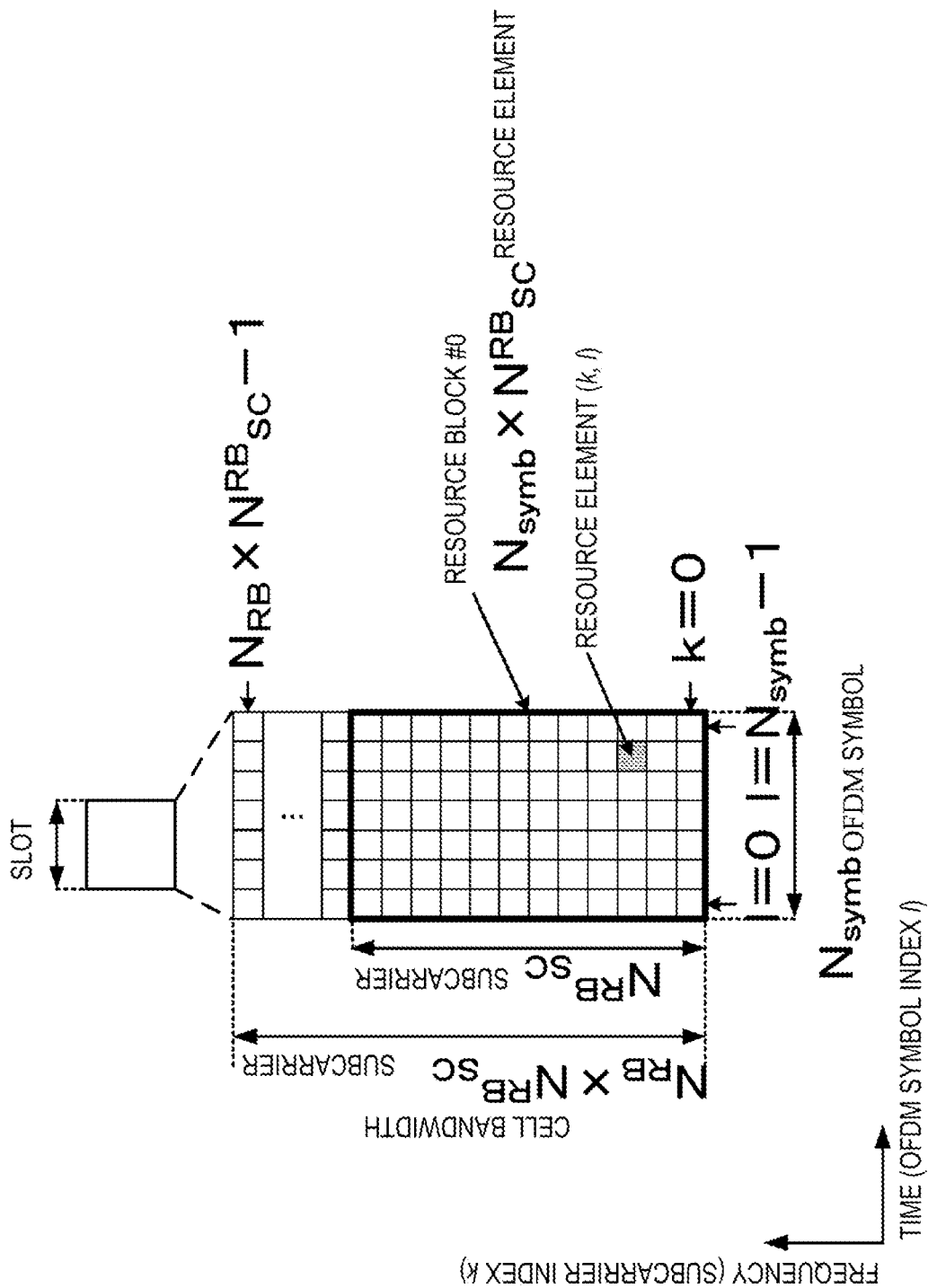
FIG. 5 is a diagram illustrating an example of resource elements included in the slot according to one implementation of the present disclosure.

FIG. 5 is a diagram illustrating an example of resource elements included in the slot according to the one implementation of the present disclosure. Here, the resource element is a resource defined by one OFDM symbol and one subcarrier. As illustrated in FIG. 5, the slot includes Nsymb pieces of OFDM symbols. The number of subcarriers included in the slot may be given by a product of the number NRB of resource blocks included in the slot and the number NRBSC of subcarriers per resource block. Here, the resource block is a group of the resource elements in the time domain and the frequency domain. The resource block may be used as a unit of resource allocation in the time domain and/or the frequency domain. For example, the NRBSC may be 12. The Nsymb may be the same as the number of OFDM symbols included in the subframe. The Nsymb may be the same as the number of OFDM symbols included in the slot. The NRB may be given based on a bandwidth of a cell and a subcarrier spacing. The NRB may be given based on higher layer signaling (for example, RRC signaling) transmitted from the base station apparatus 3, and the like. Additionally, the NRB may be given based on the description in the specifications, and the like. The resource element is identified by an index k for the subcarrier and an index 1 for the OFDM symbol.

Figure 6:
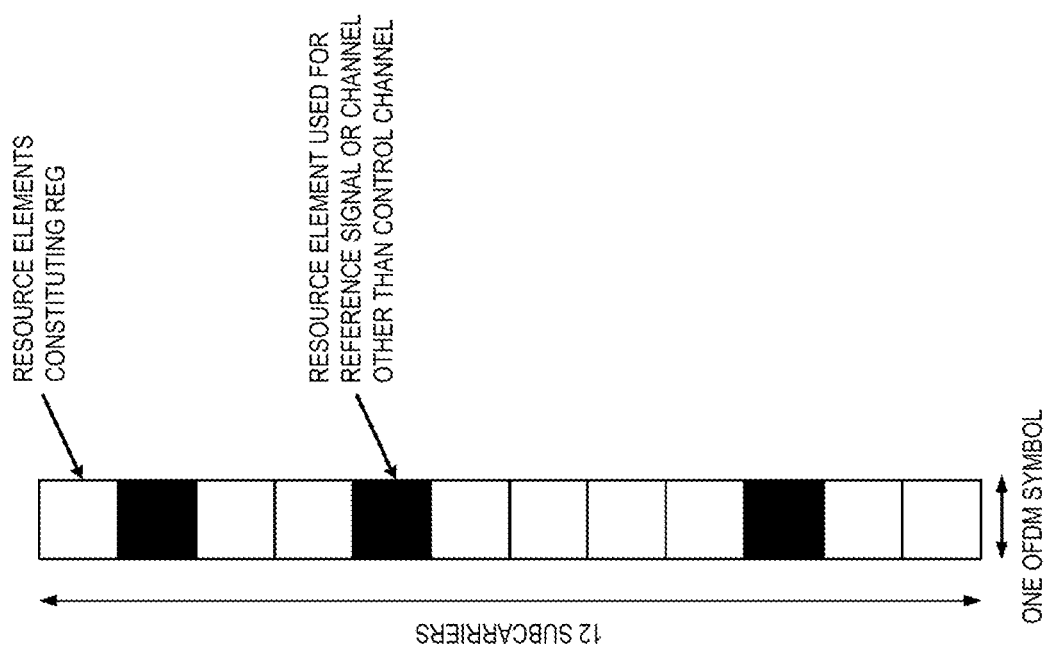
FIG. 6 is a diagram illustrating an example of a configuration of one resource element group (REG) according to one implementation of the present disclosure.

FIG. 6 is a diagram illustrating an example of a configuration of one REG according to the one implementation of the present disclosure. The REG may include one OFDM symbol in one PRB. That is, the REG may include 12 continuous REs in the frequency domain. Some of multiple REs comprising the REG may be an RE to which the downlink control information is not mapped. The REG may include the RE to which the downlink control information is not mapped or need not include the RE to which the downlink control information is not mapped. The RE to which the downlink control information is not mapped may be an RE to which the reference signal is mapped, may be an RE to which a channel other than the control channel is mapped, or may be an RE which the terminal apparatus 1 assumes to have no control channel mapped.

Figure 7:
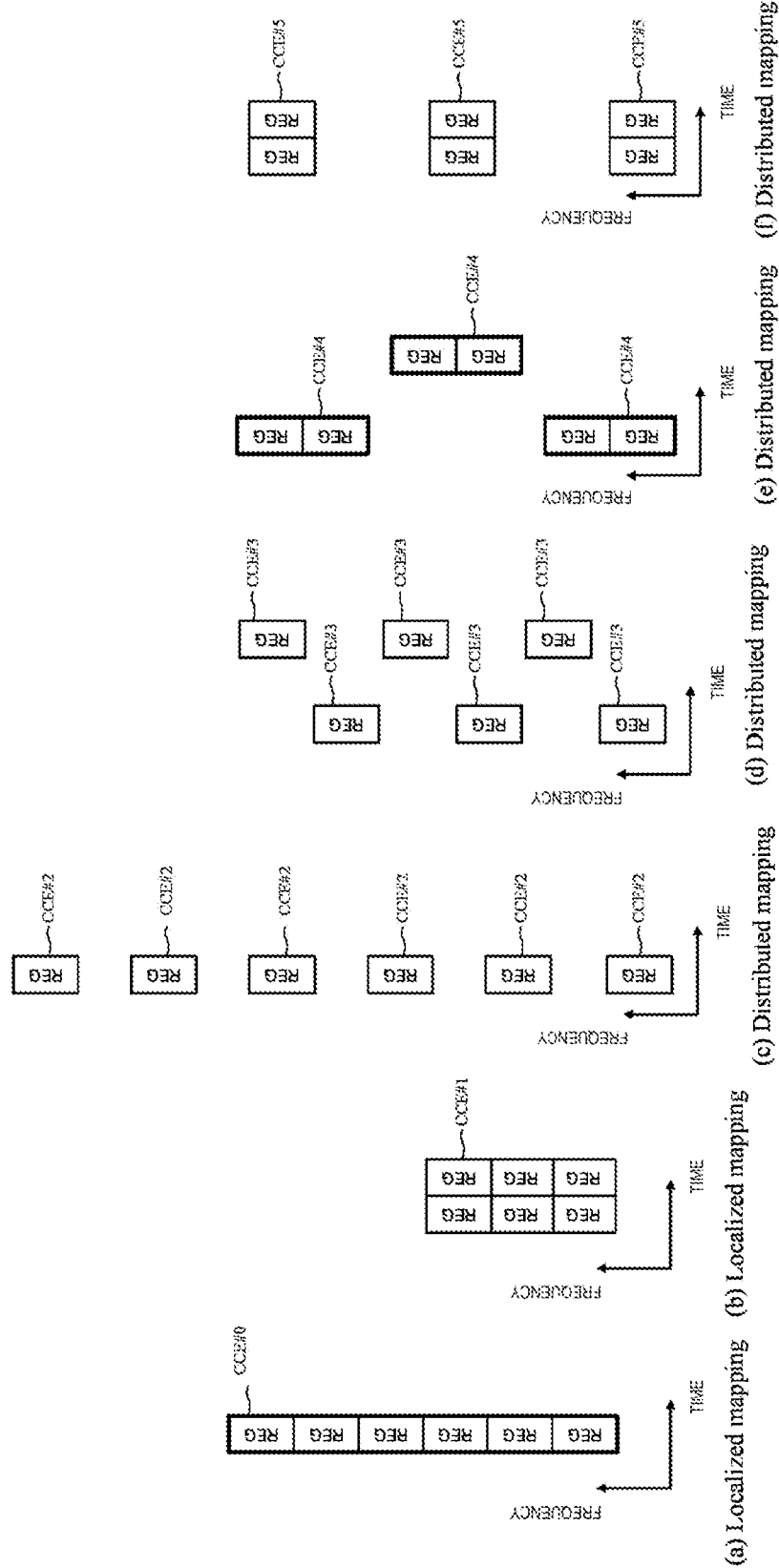
FIG. 7 is a diagram illustrating a configuration of control channel elements (CCEs) according to one implementation of the present disclosure.

FIG. 7 is a diagram illustrating a configuration of CCEs according to the one implementation of the present disclosure. The CCE may include six REGs. As illustrated in FIG. 7(a), the CCE may include REGs that are mapped continuously (such a manner of mapping may be referred to as Localized mapping) (such a manner of mapping may be referred to as non-interleaved CCE-to-REG mapping) (such a manner of mapping may be referred to as non-interleaved mapping). Note that not necessarily all of the REGs comprising the CCE need to be continuous in the frequency domain. For example, in a case that none of multiple resource blocks comprising the control resource set is continuous in the frequency domain and numbers assigned to the REGs are continuous, each of the resource blocks comprising each of the REGs assigned such continuous numbers is not continuous in the frequency domain. In a case that the control resource set includes multiple OFDM symbols and multiple REGs comprising a single CCE are mapped to multiple time periods (OFDM symbols), as illustrated in FIG. 7(b), the CCE may include a REG group that is mapped continuously. As illustrated in FIG. 7(c), the CCE may include REGs that are mapped non-continuously (such a manner of mapping may be referred to as Distributed mapping) (such a manner of mapping may be referred to as interleaved CCE-to-REG mapping) (such a manner of mapping may be referred to as interleaved mapping). The REGs comprising the CCE by using an interleaver may be non-continuously mapped to resources in the time frequency domain. In a case that the control resource set includes multiple OFDM symbols and multiple REGs comprising a single CCE are mapped to multiple time periods (OFDM symbols), as illustrated in FIG. 7(d), the CCE may include REGs that are non-continuously mapped with REGs of different time periods (OFDM symbols) being mixed. As illustrated in FIG. 7(e), the CCE may include REGs that are mapped in a distributed manner in the unit of multiple REG groups. As illustrated in FIG. 7(f), the CCE may include REGs that are mapped in a distributed manner in the unit of multiple REG groups.

The CCE may include one or multiple REG groups. The REG group is also referred to as a REG bundle (bundle). The number of REGs comprising a single REG group is referred to as a Bundle size. For example, the Bundle size of the REGs may be any one of 1, 2, 3, and 6. In the interleaved mapping, an interleaver may be applied to each REG bundle. The terminal apparatus 1 may assume that precoders applied to the REs in the REG group are the same. The terminal apparatus 1 can perform channel estimation assuming that the precoder applied to the REs in the REG group is the same. Meanwhile, the terminal apparatus 1 may assume that the precoders applied to the REs are not the same between the REG groups. In other words, the terminal apparatus 1 need not assume that the precoders applied to the REs are the same between the REG groups. The phrase "between the REG groups" may also be interpreted as "between the two different REG groups". The terminal apparatus 1 can perform the channel estimation assuming that the precoders applied to the REs are not the same between the REG groups. The details of the REG group are described later.

The number of CCEs comprising the PDCCH candidate is also referred to as an Aggregation Level (AL). In a case that a single PDCCH candidate includes an aggregation of multiple CCEs, the single PDCCH candidate includes multiple CCEs whose numbers of the CCEs are continuous. A set of the PDCCH candidates with the aggregation level of ALX is also referred to as a search space with the aggregation level ALX. In other words, the search space with the aggregation level ALX may include one or multiple PDCCH candidates with the aggregation level of ALX. The search space may also include the PDCCH candidates with the multiple aggregation levels. For example, the CSS may include the PDCCH candidates with the multiple aggregation levels. For example, the USS may include the PDCCH candidates with the multiple aggregation levels. A set of the aggregation levels of the PDCCH candidates included in the CSS and a set of the aggregation levels of the PDCCH candidates included in the USS may be individually defined/configured.

Hereinafter, the REG group will be described.

The REG group may be used for channel estimation in the terminal apparatus 1. For example, the terminal apparatus 1 performs the channel estimation for each REG group. This is based on a difficulty in performing the channel estimation (for example, Minimum Mean Squared Error (MMSE) channel estimation and the like) in the REs for the reference signals to which different precoders are applied. Here, the MMSE is an abbreviation for Minimum Mean Square Error.

The accuracy of channel estimation varies depending on at least a power allocated to the reference signal, a density of an RE in the time frequency domain, the RE being used for the reference signal, an environment of a radio channel, and the like. The accuracy of channel estimation varies depending on at least the time frequency domain used for the channel estimation. In various implementations of the present disclosure, the REG group may be used as a parameter to configure the time frequency domain used for the channel estimation.

That is, a larger REG group means that a higher gain of the channel estimation accuracy can be obtained. Meanwhile, a smaller REG group means that a larger number of REG groups are included in one PDCCH candidate. The larger number of REG groups in one PDCCH candidate is preferable for a transmission method (referred to as precoder rotation, precoder cycling, and the like) that obtains spatial diversity by individually applying precoders to the respective REG groups.

One REG group may include the continuous or close REGs in the time domain and/or the frequency domain.

The REG group in the time domain is preferable for improving the channel estimation accuracy and/or reduction in the reference signals. For example, the number of REGs comprising the REG group in the time domain may be 1, 2, 3, or another value. The number of REGs comprising the REG group in the time domain may be given at least based on the number of OFDM symbols included in the control resource set. Additionally, the number of REGs comprising the REG group in the time domain may be the same as the number of OFDM symbols included in the control resource set.

The REG group in the frequency domain contributes to the improvement of the channel estimation accuracy. For example, the number of REGs comprising the REG group in the frequency domain may be 2, 3, at least a multiple of 2, or at least a multiple of 3. Additionally, the number of REGs comprising the REG group in the frequency domain may be given at least based on the number of PRBs in the control resource set. Additionally, the number of REGs comprising the REG group in the frequency domain may be the same as the number of PRBs included in the control resource set.

Figure 8:
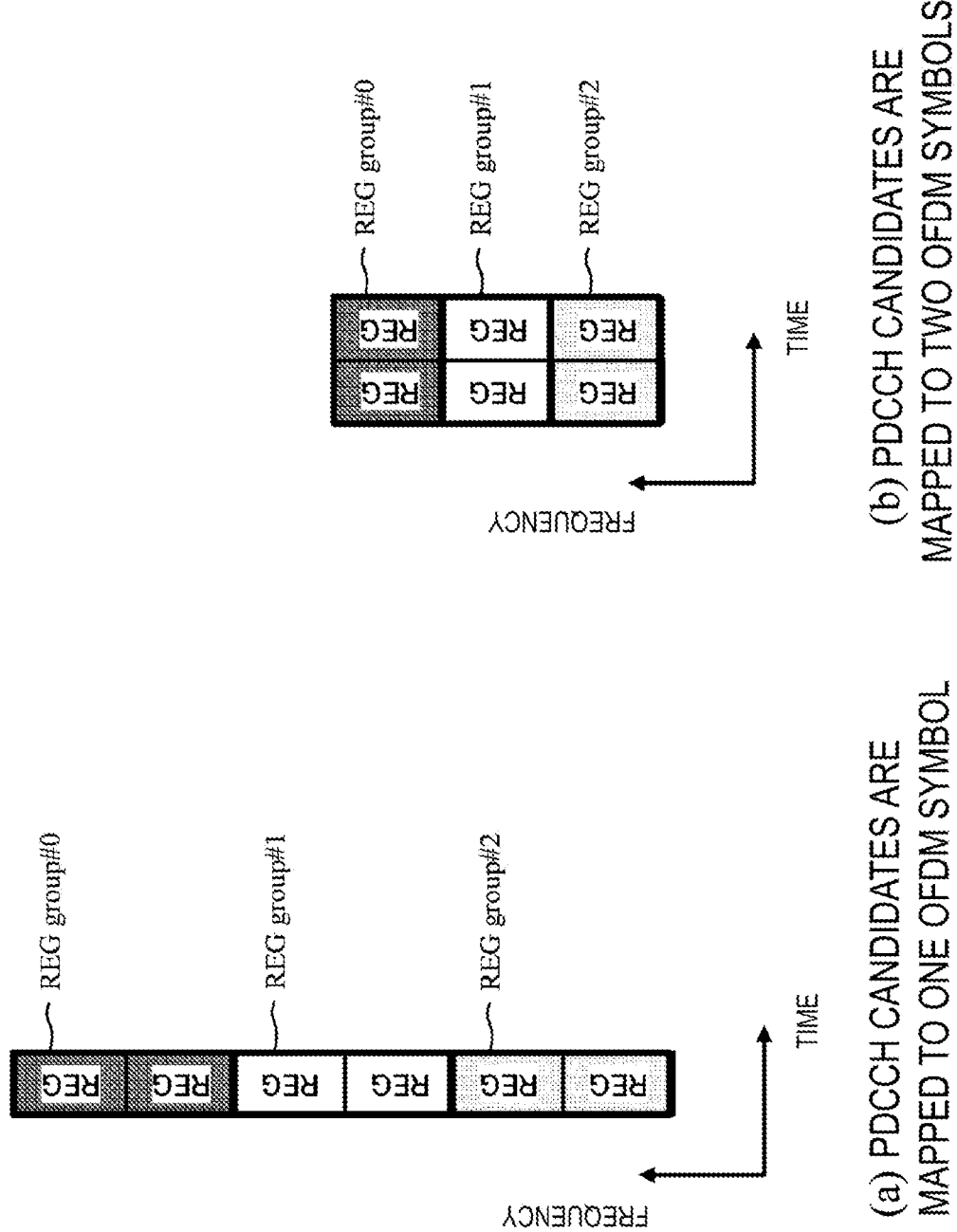
FIG. 8 is a diagram illustrating an example of a relationship between the number of REGs comprising a REG group and a mapping method of the PDCCH candidate according to one implementation of the present disclosure.

FIG. 8 is a diagram illustrating an example of a relationship between the number of REGs comprising a REG group and a mapping method of the PDCCH candidate according to one implementation of the present disclosure. In one example illustrated in FIG. 8(a), the PDCCH candidates are mapped to one OFDM symbol, and three REG groups including two REGs are configured. In other words, in one example illustrated in FIG. 8(a), one REG group includes the two REGs. The number of REGs comprising the REG group in the frequency domain may include a divisor of the number of PRBs mapped in the frequency direction. In the example illustrated in FIG. 8(a), the number of REGs comprising the REG group in the frequency domain may be 1, 2, 3, or 6.

In one example illustrated in FIG. 8(b), the PDCCH candidates are mapped to two OFDM symbols, and three REG groups including two REGs are configured. In one example illustrated in FIG. 8(b), the number of REGs comprising the REG group in the frequency domain may be either 1 or 3.

The number of REGs comprising the REG group in the frequency domain may be given at least based on the number of OFDM symbols to which the PDCCH candidates are mapped. The number of REGs comprising the REG group in the frequency domain may be configured individually for the number of OFDM symbols to which the PDCCH candidate is mapped. The number of REGs comprising the REG group in the frequency domain may be given at least based on the mapping method (mapping type) of the REGs comprising the CCE. The number of REGs comprising the REG group in the frequency domain may be configured individually for the mapping method of the REGs comprising the CCE. The mapping method of the REGs comprising the CCE may be either the interleaved mapping or the non-interleaved mapping. The mapping method of the REGs comprising the CCE may be either a continuous mapping method or a non-continuous mapping method. The number of REGs comprising the REG group in the frequency domain may be given at least based on the number of OFDM symbols to which one CCE is mapped. The number of REGs comprising the REG group in the frequency domain may be configured individually for the number of OFDM symbols to which one CCE is mapped.

Figure 9:
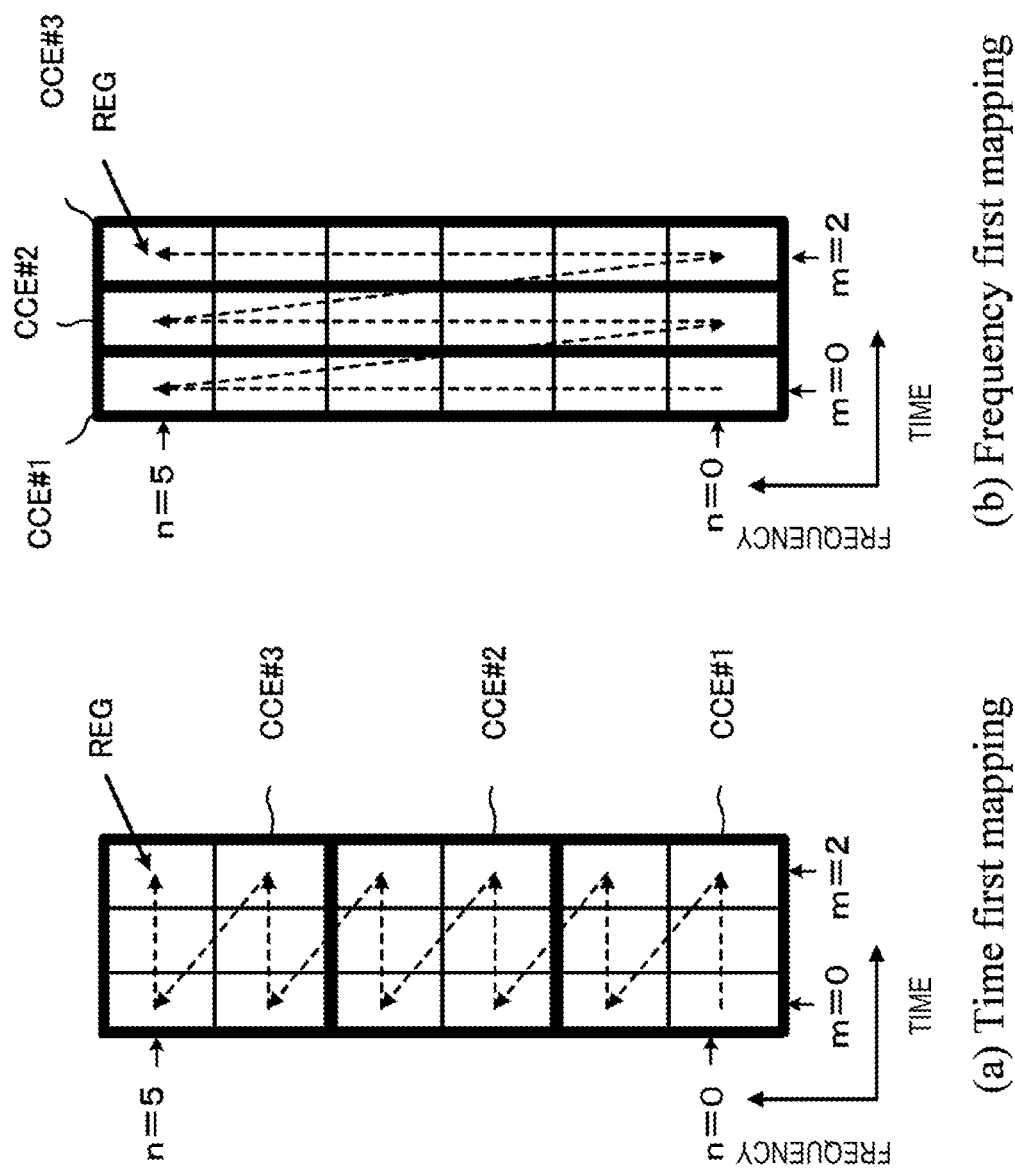
FIG. 9 is a diagram illustrating an example of the mapping of the REGs comprising the CCE according to one implementation of the present disclosure.

FIG. 9 is a diagram illustrating an example of the mapping of the REGs comprising the CCE according to the one implementation of the present disclosure. The description herein illustrates a case that the number of OFDM symbols comprising the control resource set is three. In FIG. 9, the CCE includes the six REGs. In FIG. 9, values of m=0 to 2 (0, 1, 2) are assigned to indices m of the REGs in the time domain from the left. In FIG. 9, values of n=0 to 5 (0, 1, 2, 3, 4, 5) are assigned to indices n of the REGs in the frequency domain from below. FIG. 9(a) illustrates an example in which the REGs comprising the CCE are mapped in a Time first manner. The Time first mapping is a mapping method that maps the REGs from a lower (smaller) index to a higher (larger) index of the REGs in the time domain and increment the index of the REG in the frequency domain by one at a point of time when the index of the REG in the time domain reaches the maximum. FIG. 9(b) illustrates an example in which the REGs comprising the CCE are mapped in a Frequency first manner. The Frequency first mapping is a mapping method that maps the REGs from a lower (smaller) index to a higher (larger) index of the REGs in the frequency domain and increment the index of the REG in the time domain by one at a point of time when the index of the REG in the frequency domain reaches the maximum.

The number of REGs comprising the REG group in the time domain may be given at least based on the number of OFDM symbols to which the PDCCH candidates are mapped. The number of REGs comprising the REG group in the time domain may be configured individually for the number of OFDM symbols to which the PDCCH candidates are mapped. The number of REGs comprising the REG group in the time domain may be given at least based on the number of OFDM symbols to which one CCE is mapped.

The number of REGs comprising the REG group in the time domain may be configured individually for the number of OFDM symbols to which one CCE is mapped.

The REG group in the time domain is also preferable for reduction in the reference signals. As illustrated in FIG. 9 (b), in a case that the REG group is configured, the reference signal may be included in an anterior OFDM symbol and/or a posterior OFDM symbol. For example, in the time domain, the first REG (head REG) in the REG group may include an RE to which the downlink control information is not mapped, and REGs other than the first REG in the REG group need not include REs to which the downlink control information is not mapped.

A configuration example of the terminal apparatus 1 according to the one implementation of the present disclosure will be described below.

Figure 10:
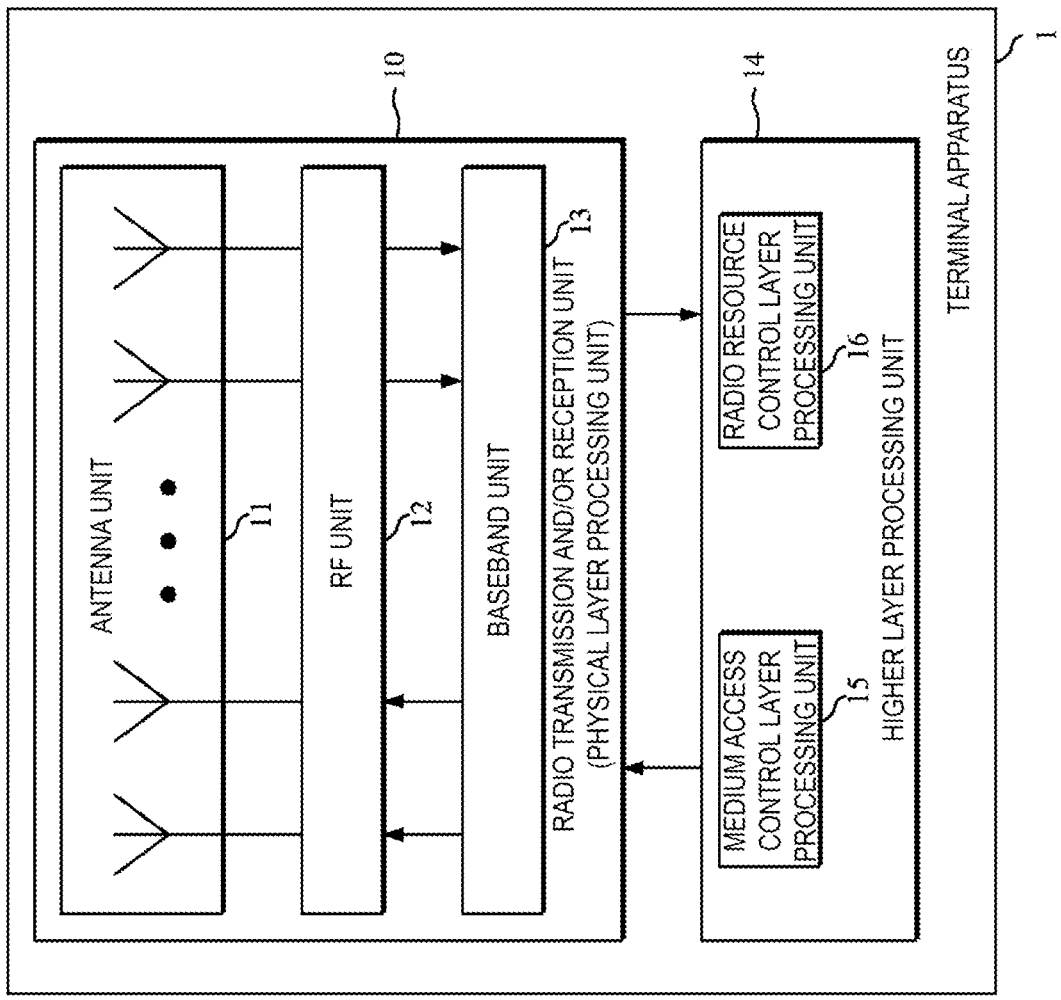
FIG. 10 is a schematic block diagram illustrating a configuration of a terminal apparatus 1 according to one implementation of the present disclosure.

FIG. 10 is a schematic block diagram illustrating a configuration of a terminal apparatus 1 according to one implementation of the present disclosure. As illustrated, the terminal apparatus 1 includes a radio transmission and/or reception unit 10 and a higher layer processing unit 14. The radio transmission and/or reception unit 10 includes an antenna unit 11, a Radio Frequency (RF) unit 12, and a baseband unit 13. The higher layer processing unit 14 includes a medium access control layer processing unit 15 and a radio resource control layer processing unit 16. The radio transmission and/or reception unit 10 is also referred to as a transmitter, a receiver or a physical layer processing unit. The physical layer processing unit includes a decoding unit and reception processing unit. The receiver of the terminal apparatus 1 receives the PDCCH. The decoding unit of the terminal apparatus 1 decodes the received PDCCH. More specifically, the decoding unit of the terminal apparatus 1 performs blind decoding processing on received signals of resources associated with the PDCCH candidates of the USS. The decoding unit of the terminal apparatus 1 performs brand decoding processing on received signals of resources associated with the PDCCH candidates of the CSS. The reception processing unit of the terminal apparatus 1 monitors the PDCCH candidates in the control resource set. The reception processing unit of the terminal apparatus 1 monitors the PDCCH candidates used for the PDCCH including a CC-RNTI. The reception processing unit of the terminal apparatus 1 receives the PDCCH including the Unlicensed access common information in the control resource set of each LBT subband of the BWP (monitors the PDCCH candidates used for the PDCCH). The terminal apparatus 1 receives the PDCCH including the Unlicensed access common information (control information indicating a configuration of the subframe of the LBT subband) in the control resource set of each LBT subband, and controls reception processing of each LBT subband.

The higher layer processing unit 14 outputs uplink data (transport block) generated by a user operation or the like, to the radio transmission and/or reception unit 10. The higher layer processing unit 14 performs processing of a MAC layer, a Packet Data Convergence Protocol (PDCP) layer, a Radio Link Control (RLC) layer, and an RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various types of configuration information/parameters of the terminal apparatus 1. The radio resource control layer processing unit 16 sets various types of configuration information/parameters based on a higher layer signaling received from the base station apparatus 3. Namely, the radio resource control layer processing unit 16 sets the various types of configuration information/parameters in accordance with the information for indicating the various types of configuration information/parameters received from the base station apparatus 3. The radio resource control layer processing unit 16 configures the control resource set, based on RRC signaling received from the base station apparatus 3. The radio resource control layer processing unit 16 configures the control resource set for each LBT subband in the BWP, based on RRC signaling received from the base station apparatus 3. The radio resource control layer processing unit 16 configures a frequency bandwidth and a frequency position (a number of the resource block) of the BWP. The radio resource control layer processing unit 16 configures the frequency bandwidth and the frequency position (the number of the resource block) of one or multiple LBT subbands. Note that the frequency bandwidth and the frequency position (the number of the resource block) as candidates of the LBT subband may be determined in a specification in advance and assigned a number, the number of each of the LBT subbands may be reported from the base station apparatus 3, and the radio resource control layer processing unit 16 of the terminal apparatus 1 may thereby configure the frequency bandwidth and the frequency position (the number of the resource block) of each of the LBT subbands, based on the reported number.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3.

The RF unit 12 converts (down-converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the converted digital signal, performs an FFT of the signal from which the CP has been removed, and extracts a signal in the frequency domain.

The baseband unit 13 generates an OFDM symbol by performing Inverse Fast Fourier Transform (IFFT) of the data, adds CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 by using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power control unit.

The terminal apparatus 1 receives the PDCCH. The radio resource control layer processing unit 16 configures the control resource set, based on RRC signaling. The radio resource control layer processing unit 16 configures the common control resource set, based on RRC signaling. The receiver of the terminal apparatus 1 monitors multiple PDCCH candidates in the configured control resource set. The decoding unit of the terminal apparatus 1 decodes the monitored PDCCH candidates. The radio resource control layer processing unit 16 configures the control resource set for each LBT subband (LBT grid) in the BWP. The terminal apparatus 1 receives the PDCCH including control information indicating a configuration of the subframe of a corresponding LBT subband in each control resource set. The terminal apparatus 1 receives the PDCCH including control information indicating a configuration of the subframe of a corresponding LBT subband in each control resource set that is configured by using multiple resource blocks in the corresponding LBT subband.

A configuration example of the base station apparatus 3 according to one implementation of the present disclosure will be described below.

Figure 11:
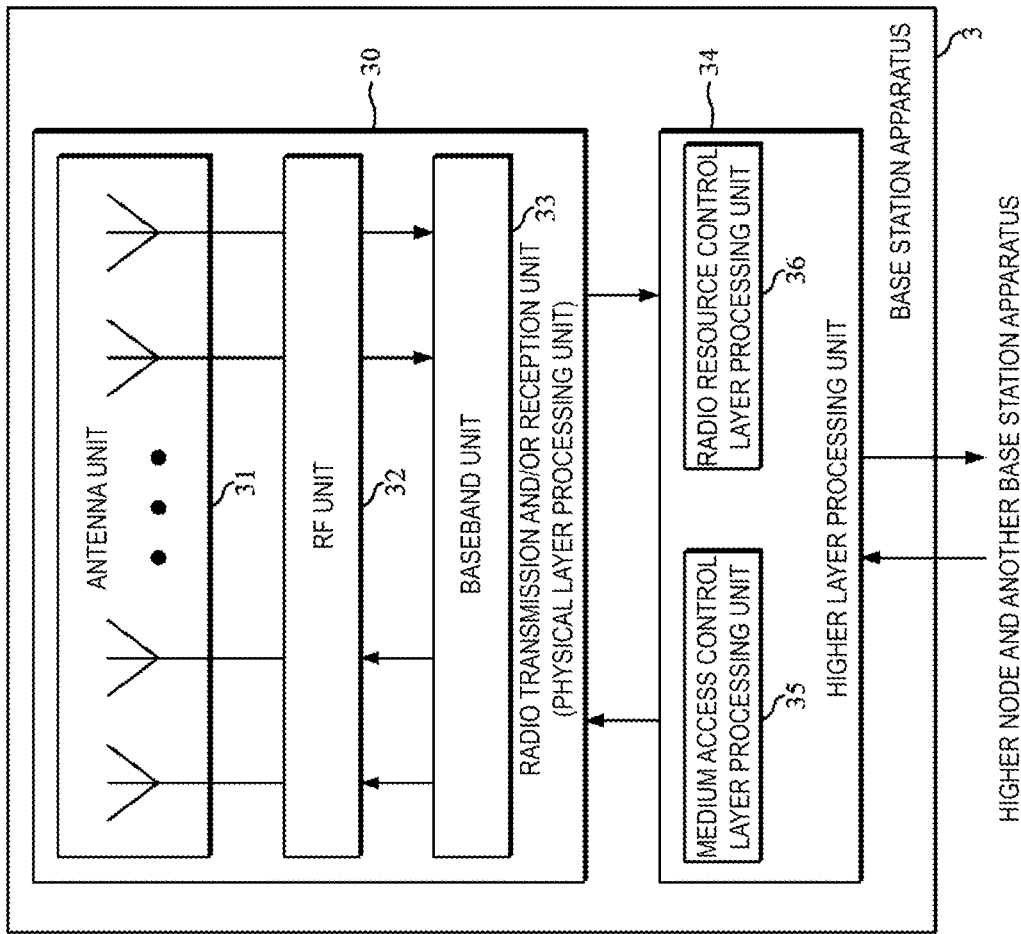
FIG. 11 is a schematic block diagram illustrating a configuration of a base station apparatus 3 according to one implementation of the present disclosure.

FIG. 11 is a schematic block diagram illustrating a configuration of a base station apparatus 3 according to one implementation of the present disclosure. As illustrated, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmitter, a receiver or a physical layer processing unit.

The higher layer processing unit 34 performs processing of a MAC layer, a PDCP layer, an RLC layer, and an RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 generates, or acquires from a higher node, downlink data (transport block) allocated on a PDSCH, system information, an RRC message (RRC signaling), a MAC CE, and the like, and outputs the data to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/reports information indicating various types of configuration information/parameters.

The radio resource control layer processing unit 36 configures the control resource set for each LBT subband in the BWP for the terminal apparatus 1. The radio resource control layer processing unit 36 configures a frequency bandwidth and a frequency position (a number of the resource block) of the BWP. The radio resource control layer processing unit 36 configures the frequency bandwidth and the frequency position (the number of the resource block) of one or multiple LBT subbands. Note that the frequency bandwidth and the frequency position (the number of the resource block) as candidates of the LBT subband may be determined in a specification in advance and assigned a number, the number of each of the LBT subbands may be reported from the base station apparatus 3, and the frequency bandwidth and the frequency position (the number of the resource block) of each of the LBT subbands may thereby be configured in the terminal apparatus 1, based on the reported number.

The function of the radio transmission and/or reception unit 30 is similar to that of the radio transmission and/or reception unit 10 illustrated in FIG. 10 [A1]. Further, the radio transmission and/or reception unit 30 recognizes a Search space (SS) that is configured for the terminal apparatus 1. The radio transmission and/or reception unit 30 includes an SS recognition unit, and the SS recognition unit recognizes the SS configured for the terminal apparatus 1. The SS recognition unit recognizes one or more PDCCH candidates in the control resource set that are configured as the Search space of the terminal apparatus. The SS recognition unit recognizes the PDCCH candidate(s) (the number of PDCCH candidates or a number of each of the PDCCH candidates) that are configured in each individual control resource set of the terminal apparatus 1. The SS recognition unit recognizes the PDCCH candidate(s) (the number of PDCCH candidates or the number of each of the PDCCH candidates) that are configured in the common control resource set. The SS recognition unit recognizes the PDCCH candidate(s) (the number of PDCCH candidates or the number of each of the PDCCH candidates) that are configured in the control resource set of each LBT subband in the BWP. A transmitter of the radio transmission and/or reception unit 30 transmits the PDCCH by using the PDCCH candidate(s).

The transmitter (transmission processing unit) of the radio transmission and/or reception unit 30 of the base station apparatus 3 transmits the PDCCH including a CC-RNTI. The transmitter (transmission processing unit) of the radio transmission and/or reception unit 30 of the base station apparatus 3 transmits the PDCCH including the Unlicensed access common information in the control resource set of each LBT subband in the BWP. The transmitter (transmission processing unit) of the radio transmission and/or reception unit 30 of the base station apparatus 3 transmits the PDCCH including the Unlicensed access common information (control information indicating a configuration of the subframe of the LBT subband) in the control resource set of each LBT subband.

The radio resource control layer processing unit 36 configures each control resource set that is configured in the BWP by using multiple resource blocks in a corresponding LBT subband.

Each of the units included in the terminal apparatus 1 may be configured as a circuit. Each of the units included in the base station apparatus 3 may be configured as a circuit.

An example of an initial connection procedure according to the present disclosure will be described below.

The base station apparatus 3 includes a communicable range (or a communication area) controlled by the base station apparatus 3. The communicable range is divided into one or multiple cells (or serving cells, sub-cells, beams, and the like), and communications with the terminal apparatus 1 can be managed for each cell. Meanwhile, the terminal apparatus 1 selects at least one cell from the multiple cells and attempts to establish a connection with the base station apparatus 3. Here, a first state in which the connection between the terminal apparatus 1 and at least one cell of the base station apparatus 3 is established is also referred to as RRC Connection. A second state in which the terminal apparatus 1 has not established the connection with any cell of the base station apparatus 3 is also referred to as RRC idle. In addition, a third state in which the connection of the terminal apparatus 1 with at least one cell of the base station apparatus 3 is established but some functions are limited between the terminal apparatus 1 and the base station apparatus 3 is also referred to as RRC suspended. The RRC suspended is also referred to as RRC inactive.

Figure 12:
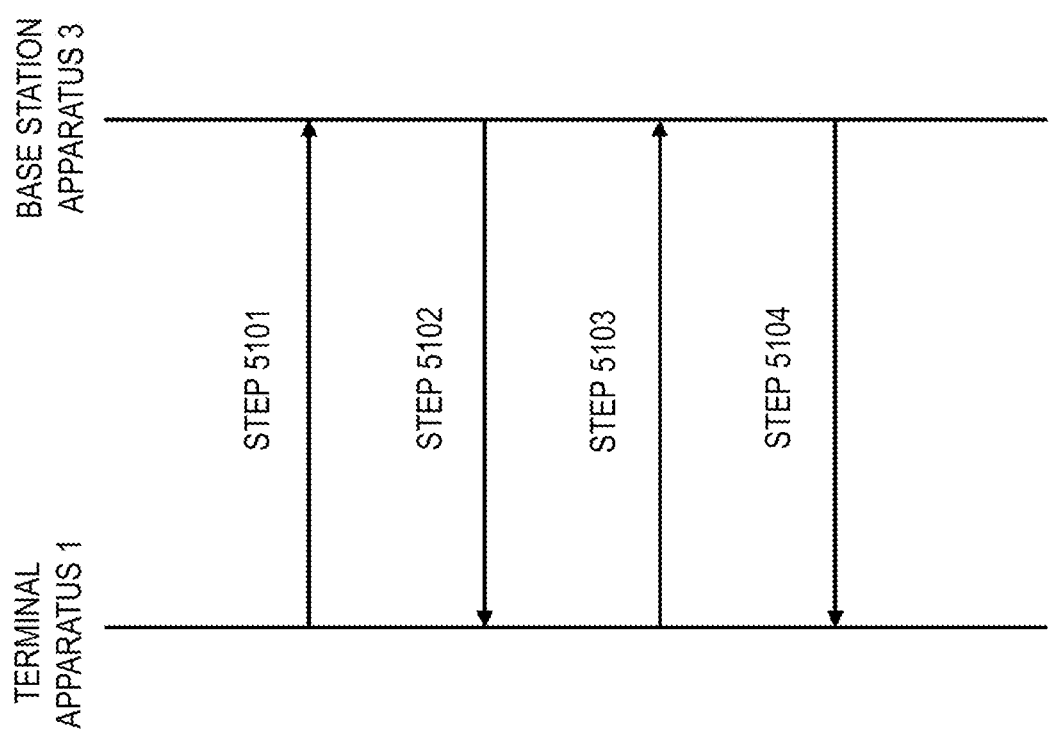
FIG. 12 is a diagram illustrating an example of a first initial connection procedure (4-step contention based ran-dom access channel (RACH) procedure) according to one implementation of the present disclosure.

The terminal apparatus 1 in RRC idle may attempt to establish a connection with at least one cell of the base station apparatus 3. Here, the cell to which the terminal apparatus 1 attempts to connect is also referred to as a target cell. FIG. 12 is a diagram illustrating an example of a first initial connection procedure (4-step contention based RACH procedure) according to the one implementation of the present disclosure. The first initial connection procedure includes at least some of Steps 5101 to 5104.

Step 5101 is a step in which the terminal apparatus 1 requests, via a physical channel, a target cell to respond for initial connection. Alternatively, step 5101 is a step in which the terminal apparatus 1 performs initial transmission to the target cell via the physical channel. Here, the physical channel may be a PRACH, for example. The physical channel may be a channel dedicatedly used to request a response for initial connection. In step 5101, the message transmitted from the terminal apparatus 1 via the physical channel is also referred to as a random access message 1. A signal of the random access message 1 may be generated based on a random access preamble index u that is given by a higher layer of the terminal apparatus 1.

The terminal apparatus 1 performs downlink time-frequency synchronization prior to performing step 5101. In a first state, a synchronization signal is used for the terminal apparatus 1 to establish downlink time-frequency synchronization.

The synchronization signal including an ID of a target cell (cell ID) may be transmitted. The synchronization signal including a sequence generated at least based on the cell ID may be transmitted. The synchronization signal including the cell ID may means that the sequence of the synchronization signal is given based on the cell ID. The synchronization signal may be transmitted with application of a beam (or precoder).

The beam exhibits a phenomenon in which antenna gain varies depending on directions. The beam may be given at least based on the directivity of an antenna. In addition, the beam may also be given at least based on a phase transformation of a carrier signal. In addition, the beam may also be given by the application of the precoder.

The terminal apparatus 1 receives the PBCH transmitted from the target cell. The PBCH may be transmitted that includes essential information block (MIB and Essential Information Block (EIB)) including the essential system information used for the connection of the terminal apparatus 1 with the target cell. The essential information block is system information. The essential information block may include information on the radio frame number. The essential information block may include information on a position in a super frame including multiple radio frames (e.g., information for indicating at least some of System Frame Numbers (SFNs) in the super frame). The PBCH may include an index of the synchronization signal. The PBCH may include information on the reception of a PDCCH. The essential information block may be mapped to a BCH in a transport channel. The essential information block may be mapped to a BCCH in a logical channel.

The information relating to reception of the PDCCH may include information for indicating a control resource set. The information for indicating the control resource set may include information relating to the number and the positions of PRBs to which the control resource set is mapped. The information for indicating the control resource set may include information for indicating mapping of the control resource set. The information for indicating the control resource set may include information relating to the number of OFDM symbols to which the control resource set is mapped. The information for indicating the control resource set may include information for indicating the period (periodicity) of the slot to which the control resource set is mapped. The information for indicating the control resource set may include information for indicating a position of the subframe or the slot in the time domain to which the control resource set is mapped. The terminal apparatus 1 may attempt to receive the PDCCH based on at least the information for indicating the control resource set included in the PBCH.

The Information relating to reception of the PDCCH may include information relating to an ID for indicating the destination of the PDCCH. The ID for indicating the destination of the PDCCH may be an ID used for scrambling the CRC-bits to be added to the PDCCH. The ID for indicating the destination of the PDCCH is also referred to as an RNTI. Information relating to the ID used for scrambling the CRC bits added to the PDCCH may be included. The terminal apparatus 1 may attempt to receive the PDCCH based on at least the information relating to the ID included in the PBCH.

The RNTI may include an SI-RNTI, a Paging-RNTI (a P-RNTI), a C-RNTI, a Temporary C-RNTI, a Random Access-RNTI (RA-RNTI), and a CC-RNTI. The SI-RNTI is used at least for scheduling the PDSCH transmitted with system information included therein. The P-RNTI is used at least for scheduling the PDSCH transmitted with paging information and/or information such as notification of change of the system information included therein. The C-RNTI is used at least for scheduling user data to the terminal apparatus 1 in RRC connection. The Temporary C-RNTI is used at least for scheduling a random access message 4. The Temporary C-RNTI is used at least for scheduling of the PDSCH including data to be mapped to a CCCH in the logical channel. The RA-RNTI is used at least for scheduling of the random access message 2. The CC-RNTI is used at least for transmission and/or reception of control information of Unlicensed access.

The common control resource set in which the PDSCH including the resource allocation information of the PDSCH used for transmission and/or reception of the system information (RMSI, Other System Information (OSI)) is transmitted and/or received may be mapped by being associated with the synchronization signal. The common control resource set may be mapped to the subframe that is the same as or close to the time domain to which the synchronization signal is mapped.

The information relating to reception of the PDCCH may include information relating to an aggregation level of the search space included in the control resource set. The terminal apparatus 1 may identify the aggregation level of PDCCH candidates whose reception should be attempted and determine the search space, based on at least the information relating to the aggregation level of the search space included in the control resource set included in the PBCH.

The information related to the reception of the PDCCH may include information related to the REG group (REG bundle size). The information related to the reception of the PDCCH may include information for indicating the number of REGs comprising the REG group in the frequency domain. The information related to the reception of PDCCH may include information for indicating the number of REGs comprising the REG group in the time domain.

The reference signals corresponding to the control resource set may correspond to multiple PDCCH candidates included in the control resource set. The reference signals corresponding to the control resource set may be used for demodulation of the multiple PDCCHs included in the control resource set.

The base station apparatus 3 can transmit the PBCH including information on the reception of the PDCCH and indicate monitoring of a common control resource set to the terminal apparatus 1. The terminal apparatus 1 monitors the common control resource set based on at least detecting of information relating to reception of the PDCCH included in the PBCH. The common control resource set is used at least for scheduling of the first system information (RMSI, OSI). The first system information may include system information important for the terminal apparatus 1 to connect to the target cell. The first system information may include information on various configurations of downlink. The first system information may include information on various configurations of PRACH. The first system information may include information on various configurations of uplink. The first system information may include information of a signal waveform (OFDM or DFT-s-OFDM) configured for random access message 3 transmission. The first system information may include at least a part of the system information other than information included in the MIB. The first system information may be mapped to the BCH in the transport channel. The first system information may be mapped to the BCCH in the logical channel. The first system information may include at least System Information Block type 1 (SIB1). The first system information may include at least System Information Block type 2 (SIB2). The common control resource set may be used for scheduling the random access message 2. The SIB1 may include information relating to a measurement required to perform RRC connection. Moreover, the SIB2 may include information relating to a channel which is common and/or shared among multiple terminal apparatuses 1 in a cell.

The terminal apparatus 1 may monitor the PDCCH based on at least the information on the reception of the PDCCH. The terminal apparatus 1 may monitor the PDCCH based on at least the information on the REG group. The terminal apparatus 1 may assume the configuration applied for monitoring the PDCCH based on at least the information on the reception of the PDCCH.

The base station apparatus 3 can transmit the MIB and/or the first system information and indicate the monitoring of the common control resource set to the terminal apparatus 1. The first system information may include the information on the reception of the PDCCH. The terminal apparatus 1 may monitor the common control resource set based on at least the MIB and/or the information on the reception of the PDCCH included in the first system information. The common control resource set may be used for scheduling of the PDSCH including the paging information and/or the information for the change notification of system information.

Step 5102 is a step in which the base station apparatus 3 performs a response to the random access message 1 from the terminal apparatus 1. The response is also referred to as the random access message 2. The random access message 2 may be transmitted via the PDSCH. The PDSCH including the random access message 2 is scheduled by the PDCCH. The CRC bits included in the PDCCH may be scrambled by the RA-RNTI. The random access message 2 may be transmitted with a special uplink grant included therein. The special uplink grant is also referred to as a random access response grant. The special uplink grant may be included in the PDSCH including the random access message 2. The random access response grant may include at least a Temporary C-RNTI.

The base station apparatus 3 can transmit the MIB, the first system information, and/or the second system information, and indicate monitoring of the common control resource set to the terminal apparatus 1. The second system information may include the information on the reception of the PDCCH. The terminal apparatus 1 monitors the common control resource set based on at least the MIB, and the information on the reception of the PDCCH included in the first system information and/or the second system information. The number of CRC bits added to the PDCCH may be scrambled with Temporary C-RNTI. The common control resource set may be used for scheduling the random access message 2.

The common control resource set may be further given based on at least the physical root index u included in the random access message 1 transmitted from the terminal apparatus 1 and/or a resource (PRACH resource) used for transmission of the random access message 1. Here, the random access message 1 may correspond to the monitoring of the fourth control resource set. The resource may indicate a resource of a time and/or a frequency. The resource may be given by an index of a resource block and/or an index of a slot (subframe). The monitoring of the common control resource set may be triggered by the random access message 1.

Step 5103 is a step in which the terminal apparatus 1 transmits, to the target cell, a request for RRC connection. The request for RRC connection is also referred to as a random access message 3. The random access message 3 may be transmitted via the PUSCH scheduled by the random access response grant. The random access message 3 may include an ID used to identify the terminal apparatus 1. The ID may be an ID managed in a higher layer. The ID may be an SAE Temporary Mobile Subscriber Identity (S-TMSI). The ID may be mapped to the CCCH in the logical channel.

Step 5104 is a step in which the base station apparatus 3 transmits Contention resolution message to the terminal apparatus 1. The contention resolution message is also referred to as the random access message 4. The terminal apparatus 1, after transmitting the random access message 3, monitors the PDCCH that performs scheduling of the PDSCH including the random access message 4. The random access message 4 may include a contention avoidance ID. Here, the contention avoidance ID is used to resolve a contention in which multiple terminal apparatuses 1 transmit signals by using a same radio resource. The contention avoidance ID is also referred to as UE contention resolution identity.

In step 5104, the terminal apparatus 1 which has transmitted the random access message 3 including the ID used for identifying the terminal apparatus 1 (S-TMSI, for example) monitors the random access message 4 including the Contention resolution message. In a case that the contention avoidance ID included in the random access message 4 is identical to the ID used to identify the terminal apparatus 1, the terminal apparatus 1 may consider that the contention resolution has been successfully completed, and set the value of the Temporary C-RNTI in the C-RNTI field. The terminal apparatus 1 having the value of the Temporary C-RNTI set in the C-RNTI field is considered to have completed an RRC connection.

The control resource set to monitor the PDCCH for scheduling of the random access message 4 may be the common control resource set. The base station apparatus 3 can transmit the information on the reception of PDCCH included in the random access message 2 and indicate the monitoring of the common control resource set to the terminal apparatus 1. The terminal apparatus 1 monitors the PDCCH based on at least the information relating to reception of the PDCCH included in the random access message 2.

The terminal apparatus 1 in RRC connection can receive dedicated RRC signaling mapped to the DCCH in the logical channel. The base station apparatus 3 can transmit the dedicated RRC signaling including the information on the reception of the PDCCH and indicate the monitoring of the individual control resource set to the terminal apparatus 1. The terminal apparatus 1 monitors the PDCCH based on at least the information related to the reception of the PDCCH included in the dedicated RRC signaling. Further, the base station apparatus 3 can transmit the dedicated RRC signaling including the information on the reception of the PDCCH and indicate the monitoring of the common control resource set to the terminal apparatus 1. The terminal apparatus 1 performs monitoring of the PDCCH including the CC-RNTI in the common control resource set.

The base station apparatus 3 can transmit the random access message 4 including the information on the reception of the PDCCH, and indicate the monitoring of the individual control resource set to the terminal apparatus 1. In a case that the random access message 4 includes the information on the reception of the PDCCH, the terminal apparatus 1 may monitor the individual control resource set based on at least the information on the reception of the PDCCH.

Regarding the common control resource set, not only a single type but multiple types may be configured. Depending on the application, multiple common control resource sets may be configured independently of each other. For example, the common control resource set for transmission and/or reception of the PDCCH including the CC-RNTI and the common control resource set for transmission and/or reception of the PDCCH including the SI-RNTI may be configured independently of each other.

Figure 13:
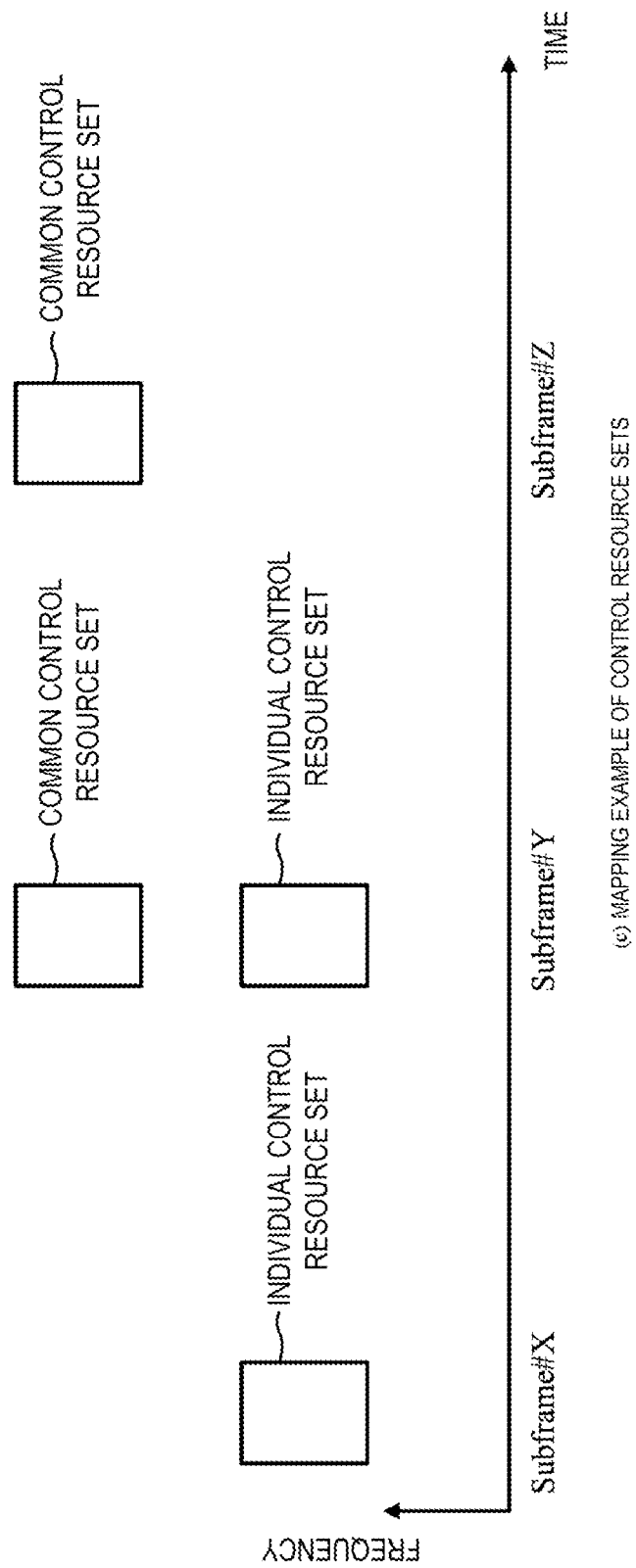
FIG. 13 is a diagram illustrating an example of the PDCCH candidates monitored by the terminal apparatus 1 according to one implementation of the present disclosure.

FIG. 13 is a diagram illustrating an example of the PDCCH candidates monitored by the terminal apparatus 1 according to the one implementation of the present disclosure. FIG. 13(*a*) illustrates an example of the PDCCH candidates of the dedicated control resource set (Dedicated CORESET, UE-specific CORESET), which are configured based on RRC signaling. FIG. 13(*a*) also represents an example of the PDCCH candidates of USS, which are configured based on RRC signaling. FIG. 13(*a*) illustrates an example in which six PDCCH candidates of aggregation level 1 are configured, six PDCCH candidates of aggregation level 2 are configured, two PDCCH candidates of aggregation level 4 are configured, and two PDCCH candidates of aggregation level 8 are configured. FIG. 13(*b*) illustrates an example of the PDCCH candidates of the common control resource set (Common CORESET). FIG. 13(*b*) also represents an example of the PDCCH candidates of CSS. FIG. 13(*b*) illustrates an example in which four PDCCH candidates of aggregation level 4 are configured, and two PDCCH candidates of aggregation level 8 are configured. FIG. 13(*c*) illustrates a mapping example of the control resource sets. In Subframe #X, only the dedicated control resource set is mapped for a certain terminal apparatus 1. In Subframe #X, as illustrated in FIG. 13(*a*), the terminal apparatus 1 monitors a total of 16 PDCCH candidates in the dedicated control resource set. In Subframe #Y, the dedicated control resource set and the common control resource set are mapped for a certain terminal apparatus 1. As illustrated in FIG. 13(*b*), the terminal apparatus 1 monitors a total of six PDCCH candidates in the common control resource set, and monitors a total of ten PDCCH candidates in the dedicated control resource set. Here, the sum of the six PDCCH candidates in the common control resource set in Subframe #Y and the ten PDCCH candidates in the dedicated control resource set in Subframe #Y is equal to the 16 PDCCH candidates in the dedicated control resource set in Subframe #X. In Subframe #Z (third time period), only the common control resource set is mapped for a certain terminal apparatus 1. In Subframe #Z, as illustrated in FIG. 13(*b*), the terminal apparatus 1 monitors a total of six PDCCH candidates in the common control resource set. Note that the common control resource set in Subframe #Y and the common control resource set in Subframe #Z may be common control resource sets of different types.

Multiple BWPs may be configured for the terminal apparatus 1, and the common control resource set and the dedicated control resource set may be configured in different BWPs. The BWP refers to a partial frequency bandwidth of a carrier (cell), and is used to limit a frequency bandwidth that is used by the terminal apparatus 1 for communication.

In the common control resource set, the PDCCH including information for indicating available resources (Preemption indication) may be transmitted and/or received. In the common control resource set, the PDCCH including information for indicating reserved resources may be transmitted and/or received. In the common control resource set, the PDCCH including information for indicating a slot format configuration (Slot Format Indication (SFI)) may be transmitted and/or received.

Operation related to Listen-Before-Talk (LBT) according to the implementations of the present disclosure will be described. First, the base station apparatus 3 determines whether or not a channel (resource, frequency band, carrier) is idle for a first time period. The base station apparatus 3 selects a random value out of a prescribed range as a backoff counter (random backoff). In a case that the base station apparatus 3 determines that the channel is idle for the first time period, the base station apparatus 3 performs carrier sensing in each sensing slot time period and determines whether or not the channel is idle. In a case that the base station apparatus 3 determines that the channel is idle in the sensing slot time period, the base station apparatus 3 decrements the value of the backoff counter, and performs carrier sensing in the next sensing slot time period again. In a case that the base station apparatus 3 determines that the channel is busy in the sensing slot time period, the base station apparatus 3 returns to the processing of determining whether or not the channel is idle for the first time period.

In a case that it is determined that the channel is idle in multiple sensing slot time periods and the value of the backoff counter reaches zero, the base station apparatus 3 starts transmission of a signal, scheduling (resource allocation) for the terminal apparatus 1, and reception of a signal from the terminal apparatus 1. In a case that an error in communication is detected (in a case that there is an occurrence of an error in data) after the transmission and/or the reception of a signal has been started, the base station apparatus 3 raises the upper limit (Contention window size) of a generation range of values in terms of generation of the backoff counter in the random backoff. In a case that an error in communication is not detected after the transmission and/or the reception of a signal has been started, the base station apparatus 3 configures the upper limit of the generation range of values to an initial value in terms of generation of the backoff counter in the random backoff.

For example, LBT is performed for each frequency band of 20 MHz. For example, carrier sensing of LBT is performed for each frequency band of 20 MHz. The unit of the frequency band of carrier sensing of LBT is referred to as an LBT subband, an LBT grid, an LBT frequency bandwidth, of the like.

Operation of Bandwidth Adaptation (BA) according to implementations of the present disclosure will be described. As the upper limit of the frequency bandwidth of a cell, a reception bandwidth and a transmission bandwidth of the terminal apparatus 1 are adjusted by the base station apparatus 3. In a case that activity of transmission and/or reception of data is low, the reception bandwidth and the transmission bandwidth of the terminal apparatus 1 may be configured to be small for the sake of reduction of power consumption. The frequency band adjusted in such a manner is a subset of total frequency bands of the cell, and is referred to as a BWP. A change of the BWP may include at least a change of a configuration of the RF unit 12 and/or a change of a configuration of the baseband unit 13.

In the terminal apparatus 1, a single Default Downlink BWP (Default DL BWP) may be configured at least based on RRC signaling. In the terminal apparatus 1, a single Initial Downlink BWP (Initial DL BWP) may be configured at least based on system information. In the terminal apparatus 1, a single Default Uplink BWP (Default UL BWP) may be configured at least based on RRC signaling. In the terminal apparatus 1, a single Initial Uplink BWP (Initial VLDL BWP) may be configured at least based on system information.

In the terminal apparatus 1, one or multiple Downlink BWPs (DL BWPs) may be configured at least based on RRC signaling. Further, in the terminal apparatus 1, one or multiple Downlink BWPs (DL BWPs) may be configured for a single serving cell, at least based on RRC signaling. In the terminal apparatus 1, one or multiple Uplink BWPs (UL BWPs) may be configured at least based on RRC signaling. Further, in the terminal apparatus 1, one or multiple Uplink BWPs (UL BWPs) may be configured for a single serving cell, at least based on RRC signaling.

Figure 14:
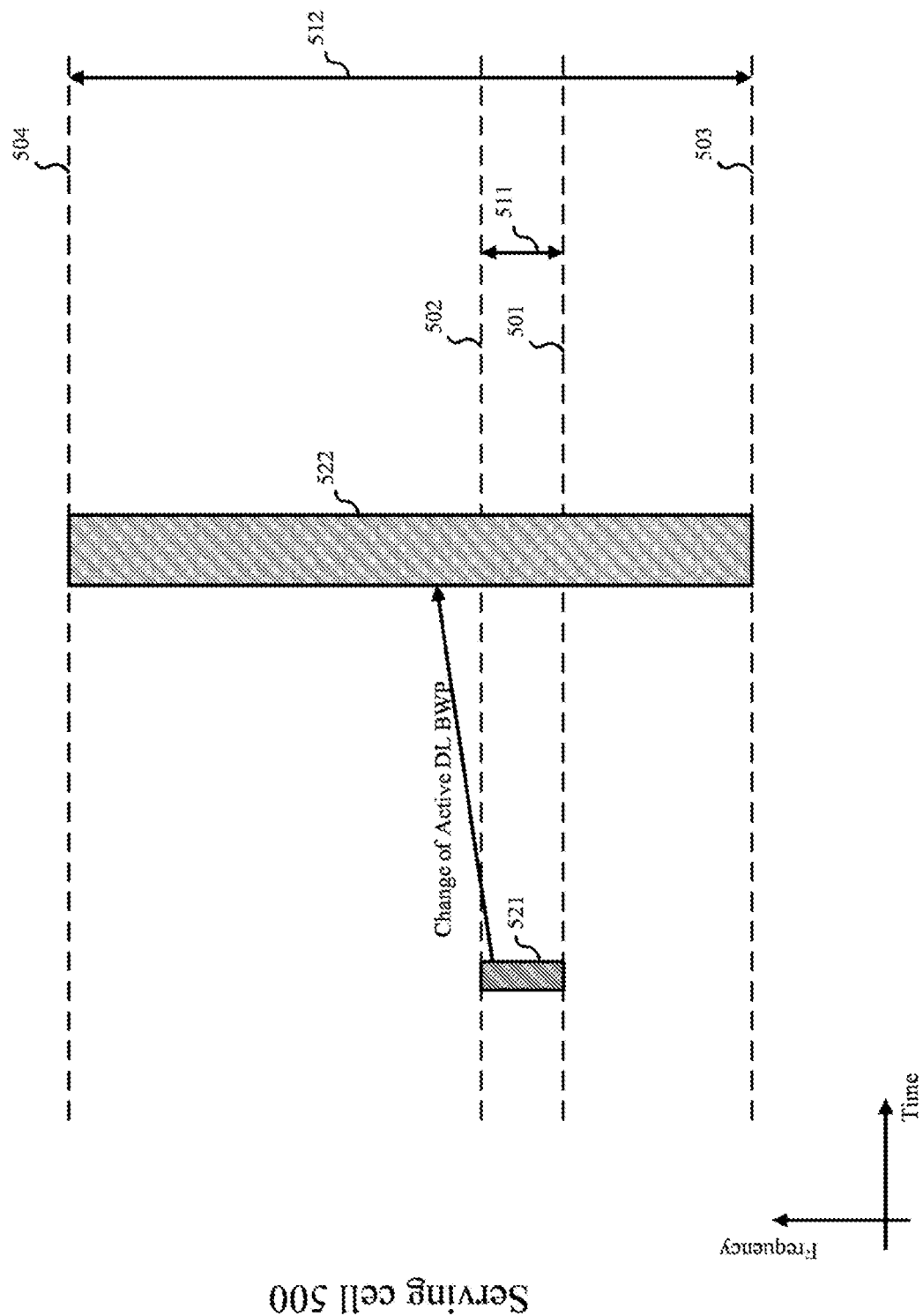
FIG. 14 is a diagram illustrating an example of Bandwidth adaptation according to one implementation of the present disclosure.

FIG. 14 is a diagram illustrating an example of Bandwidth adaptation according to one implementation of the present disclosure. In the example illustrated in FIG. 14, in a serving cell 500, a DL BWP 511 and a DL BWP 512 are configured for a certain terminal apparatus 1. In addition, the DL BWP 511 is given in the frequency band between a resource block index 501 and a resource block index 502. In addition, a DL BWP 512 is given in the frequency band between a resource block index 503 and a resource block index 504. Here, the DL BWP 511 is configured as a downlink default BWP or a downlink initial BWP.

In FIG. 14, first, the DL BWP 511 is an Active DL BWP (a DL BWP that is active). The terminal apparatus 1 performs reception of a signal in the Active DL BWP. The terminal apparatus 1 receives a PDCCH 521 in the DL BWP 511. Next, based on a bandwidth path indicator field included in a DCI format included in the PDCCH 521, the Active DL BWP is configured. A DL BWP to be activated out of DL BWPs configured for the terminal apparatus 1 in advance is indicated by the bandwidth path indicator field. In FIG. 14, the bandwidth path indicator field included in the PDCCH 521 indicates the DL BWP 512 as the Active DL BWP, and the terminal apparatus 1 configures the DL BWP 512 as the Active DL BWP. The terminal apparatus 1 receives a downlink signal 522 (PDCCH, PDSCH) in the DL BWP 512.

In a case that the Active DL BWP is configured as a DL BWP that is different from the Default DL BWP or the Initial DL BWP in the terminal apparatus 1, a timer (BWP Inactivity Timer) is started. In a case that a PDCCH including resource allocation information is not received in the Active DL BWP, a value of the timer is incremented. In a case that the value of the timer has reached a threshold that is configured in advance, the Active DL BWP is changed to the Default DL BWP or the Initial DL BWP.

Figure 15:
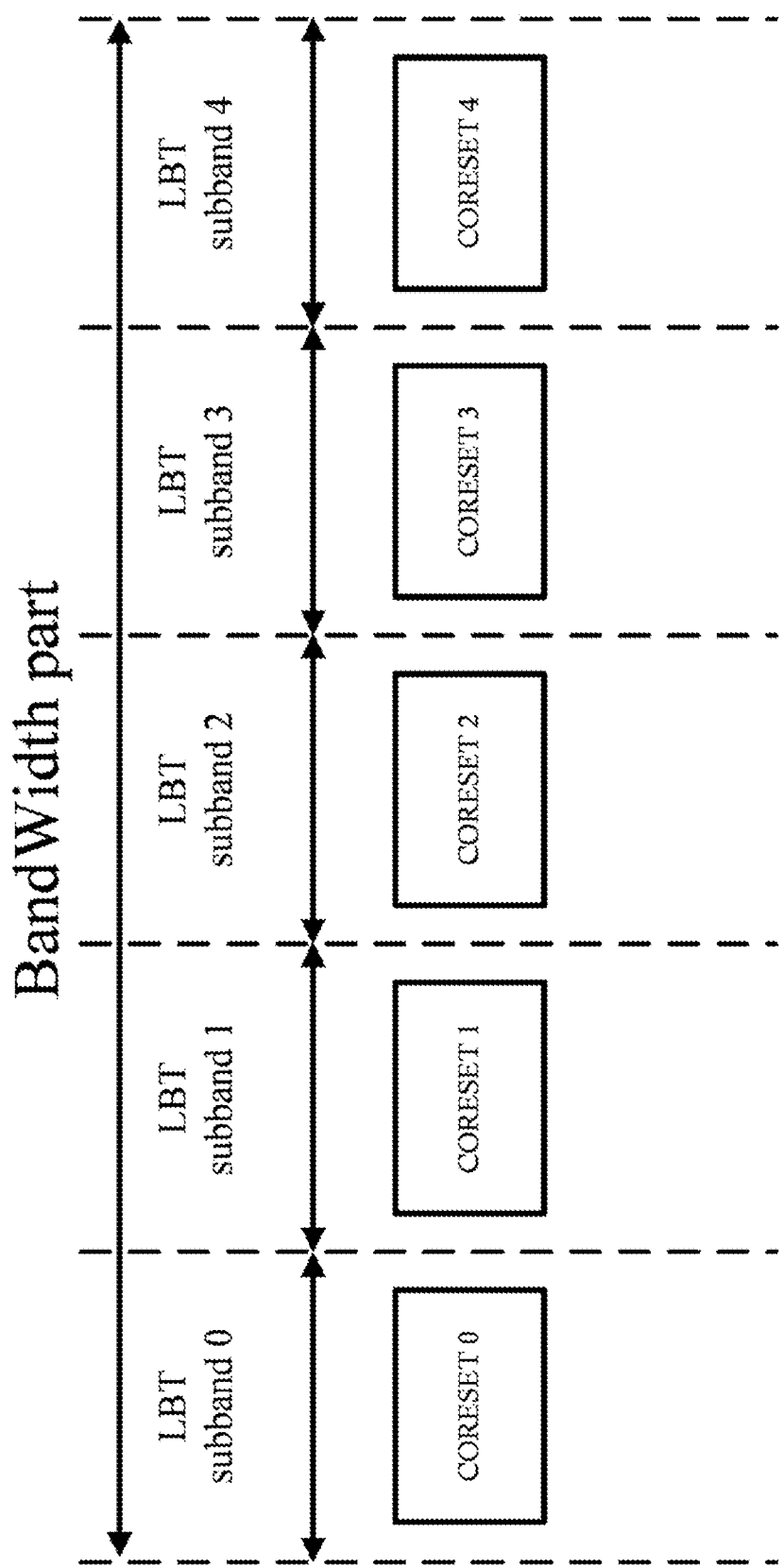
FIG. 15 is a diagram illustrating an example of a configuration of the control resource set of each LBT subband according to the one implementation of the present disclosure.

FIG. 15 is a diagram illustrating an example of a configuration of the control resource set of each LBT subband according to one implementation of the present disclosure. In FIG. 15, five LBT subbands (LBT subband 0, LBT subband 1, LBT subband 2, LBT subband 3, and LBT subband 4) are configured for the terminal apparatus 1 in the downlink BWP. For example, the frequency bandwidth of the BWP is 100 MHz, the frequency bandwidth of LBT subband 0 is 20 MHz, the frequency bandwidth of LBT subband 1 is 20 MHz, the frequency bandwidth of LBT subband 2 is 20 MHz, the frequency bandwidth of LBT subband 3 is 20 MHz, and the frequency bandwidth of LBT subband 4 is 20 MHz.

In FIG. 15, five control resource sets (CORESET 0, CORESET 1, CORESET 2, CORESET 3, and CORESET 4) are configured for the terminal apparatus 1. In each of the control resource sets, a PDCCH including control information indicating a configuration of the subframe of a corresponding LBT subband is transmitted and/or received. CORESET 0 corresponds to LBT subband 0, and is used to transmit and/or receive a PDCCH including control information indicating a configuration of the subframe of LBT subband 0. CORESET 1 corresponds to LBT subband 1, and is used to transmit and/or receive a PDCCH including control information indicating a configuration of the subframe of LBT subband 1. CORESET 2 corresponds to LBT subband 2, and is used to transmit and/or receive a PDCCH including control information indicating a configuration of the subframe of LBT subband 2. CORESET 3 corresponds to LBT subband 3, and is used to transmit and/or receive a PDCCH including control information indicating a configuration of the subframe of LBT subband 3. CORESET 4 corresponds to LBT subband 4, and is used to transmit and/or receive a PDCCH including control information indicating a configuration of the subframe of LBT subband 4.

CORESET 0 is configured by using multiple resource blocks in LBT subband 0. CORESET 1 is configured by using multiple resource blocks in LBT subband 1. CORESET 2 is configured by using multiple resource blocks in LBT subband 2. CORESET 3 is configured by using multiple resource blocks in LBT subband 3. CORESET 4 is configured by using multiple resource blocks in LBT subband 4.

The Unlicensed access common information transmitted and/or received by using the PDCCH in the control resource set of each LBT subband will be described. As the Unlicensed access common information, a downlink subframe configuration may be indicated. The downlink subframe configuration indicates a configuration of OFDM symbols occupied in a subframe. The terminal apparatus 1 recognizes OFDM symbols to be used for transmission of a downlink physical channel or a physical signal in the base station apparatus 3, based on OFDM symbols occupied in the subframe that are indicated in the downlink subframe configuration. OFDM symbols occupied in the current subframe and/or the next subframe may be indicated. Here, the current subframe refers to a subframe in which the Unlicensed access common information including information of the downlink subframe configuration is received. For example, it is indicated that 14 OFDM symbols are occupied in the next subframe. For example, it is indicated that 10 OFDM symbols are occupied in the next subframe. For example, it is indicated that 3 OFDM symbols are occupied in the next subframe. For example, it is indicated that 14 OFDM symbols are occupied in the current subframe. For example, it is indicated that 11 OFDM symbols are occupied in the current subframe. For example, it is indicated that 6 OFDM symbols are occupied in the current subframe. For example, it is indicated that 3 OFDM symbols are occupied in the current subframe.

The Unlicensed access common information may be information of an uplink subframe configuration (UL duration and offset). The uplink subframe configuration indicates a position of a subframe at which an uplink subframe is started with a reference subframe being a subframe to which the PDCCH including information of the uplink subframe configuration is mapped, and the number of subframes of the uplink subframes. The terminal apparatus 1 is not required to receive a downlink physical channel and a downlink physical signal in the subframe indicated by the information of the uplink subframe configuration. For example, the first subframe with respect to the reference subframe and one subframe are indicated, and the terminal apparatus 1 is not required to receive a downlink physical channel and a downlink physical signal in the first subframe with respect to the reference subframe. For example, the first subframe with respect to the reference subframe and six subframes are indicated, and the terminal apparatus 1 is not required to receive a downlink physical channel and a downlink physical signal in the first subframe, the second subframe, the third subframe, the fourth subframe, the fifth subframe, and the sixth subframe with respect to the reference subframe. For example, the sixth subframe with respect to the reference subframe and three subframes are indicated, and the terminal apparatus 1 is not required to receive a downlink physical channel and a downlink physical signal in the sixth subframe, the seventh subframe, and the eighth subframe with respect to the reference subframe.

The control resource set of each of multiple LBT subbands in the BWP is configured for the terminal apparatus 1, and the terminal apparatus 1 receives the PDCCH including the Unlicensed access common information corresponding to each of the LBT subbands in each control resource set. The control resource set of each of multiple LBT subbands in the BWP is configured for the terminal apparatus 1 by using resource blocks in each of the LBT subbands, and the terminal apparatus 1 receives the PDCCH including the Unlicensed access common information corresponding to each of the LBT subbands in each control resource set. The base station apparatus 3 configures the control resource set of each of multiple LBT subbands in the BWP for the terminal apparatus 1, and transmits the PDCCH including the Unlicensed access common information corresponding to each of the LBT subbands in each control resource set. The base station apparatus 3 configures the control resource set of each of multiple LBT subbands in the BWP for the terminal apparatus 1 by using resource blocks in each of the LBT subbands, and transmits the PDCCH including the Unlicensed access common information corresponding to each of the LBT subbands in each control resource set.

As has been described in the above, the base station apparatus 3 is enabled to report information of a configuration of the subframe for each LBT subband in the BWP (OFDM symbols occupied for downlink transmission and/or reception and/or OFDM symbols occupied for uplink transmission and/or reception) to the terminal apparatus 1, and resources can be efficiently utilized. In a case that the control resource set is configured for only some of the LBT subbands in the BWP and the LBT subbands with the control resource set are configured are busy, OFDM symbols occupied in idle LBT subbands cannot be indicated, and resources cannot be efficiently utilized. By adopting a configuration in which the control resource set is configured for each LBT subband where a unit in which a channel is determined idle or busy and the Unlicensed access common information is transmitted and/or received for each LBT subband, resources can be efficiently utilized for each LBT subband.

Various of apparatuses according to one implementation of the present disclosure will be described below.

To accomplish the object described previously, implementations of the present disclosure provide the following benefits. Specifically, a first implementation of the present disclosure is a terminal apparatus for receiving a PDCCH, the terminal apparatus including: a radio resource control layer processing unit configured to configure a control resource set based on RRC signaling; a receiver configured to monitor a plurality of PDCCH candidates in the control resource set; and a decoding unit configured to decode a PDCCH candidate of the plurality of PDCCH candidates where the control resource set is configured for an LBT subbands in a bandwidth part (BWP).

In addition, in the first implementation of the present disclosure, further, in each of a plurality of control resource sets, the PDCCH is received that includes control information indicating a subframe configuration of the LBT subband corresponding to the control resource set.

In addition, in the first implementation of the present disclosure, further, each of the plurality of control resource sets is configured by using multiple resource blocks in the LBT subband corresponding to the control resource set.

In addition, a second implementation of the present disclosure is a communication method used in a terminal apparatus for receiving a PDCCH, the communication method including: configuring a control resource set based on RRC signaling; monitoring a plurality of PDCCH candidates in the control resource set; and decoding a PDCCH candidate of the plurality of PDCCH candidates. The control resource set is configured for an LBT subband in a bandwidth part (BWP).

In addition, in the second implementation of the present disclosure, further, in each of a plurality of control resource sets, the PDCCH is received that includes control information indicating a subframe configuration of the LBT subband corresponding to the control resource set.

In addition, in the second implementation of the present disclosure, further, each of the plurality of control resource sets is configured by using multiple resource blocks in the LBT subband corresponding to the control resource set.

In addition, a third implementation of the present disclosure is a base station apparatus for transmitting a PDCCH, the base station apparatus including: a radio resource control layer processing unit configured to configure a control resource set for a terminal apparatus; and a transmitter configured to transmit the PDCCH by using a PDCCH candidate in the control resource set. The control resource set is configured for an LBT subband in a bandwidth part (BWP) of the terminal apparatus.

In addition, in the third implementation of the present disclosure, further, in each of a plurality of control resource sets, the PDCCH is transmitted that includes control information indicating a subframe configuration of the LBT subband corresponding to the control resource set.

In addition, in the third implementation of the present disclosure, further, each of the plurality of control resource sets is configured by using multiple resource blocks in the LBT subband corresponding to the control resource set.

In addition, a fourth implementation of the present disclosure is a communication method used in a base station apparatus for transmitting a PDCCH, the communication method including: configuring a control resource set for a terminal apparatus; and transmitting the PDCCH by using a PDCCH candidate in the control resource set. The control resource set is configured for an LBT subband in a bandwidth part (BWP) of the terminal apparatus.

In addition, in the fourth implementation of the present disclosure, further, in each of a plurality of control resource sets, the PDCCH is transmitted that includes control information indicating a subframe configuration of the LBT subband corresponding to the control resource set.

In addition, in the fourth implementation of the present disclosure, further, each of the plurality of control resource sets is configured by using multiple resource blocks in the LBT subband corresponding to the control resource set.

A program running on the base station apparatus 3 and the terminal apparatus 1 according to an implementation of the present disclosure may be a program that controls a Central Processing Unit (CPU) and the like, such that the program causes a computer to operate in such a manner as to realize the functions of the previously-described implementations according to the present disclosure. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the previously-described implementations may be partially achieved by a computer. In that case, this configuration may be realized by recording a program for realizing such control functions on a computer-readable recording medium and causing a computer system to read the program recorded on the recording medium for execution.

Note that the "computer system" refers to a computer system built into the terminal apparatus 1 or the base station apparatus 3, and the computer system includes an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system.

Moreover, the "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case. Furthermore, the previously-described program may be one for realizing some of the previously-described functions, and also may be one capable of realizing the previously-described functions in combination with a program already recorded in a computer system.

Furthermore, the base station apparatus 3 according to the previously-described implementations may be achieved as an aggregation (apparatus group) including multiple apparatuses. Each of the apparatuses constituting such an apparatus group may include some or all portions of each function or each functional block of the base station apparatus 3 according to the above-described implementations. The apparatus group is required to have a complete set of functions or functional blocks of the base station apparatus 3. Furthermore, the terminal apparatus 1 according to the previously-described implementations can also communicate with the multiple apparatuses of the base station apparatus.

Furthermore, the base station apparatus 3 according to the previously-described implementations may serve as an Evolved Universal Terrestrial Radio Access Network (EU-TRAN). Furthermore, the base station apparatus 3 according to the previously-described implementations may have some or all of the functions of a node higher than an eNodeB.

Furthermore, some or all portions of each of the terminal apparatus 1 and the base station apparatus 3 according to the previously-described implementations may be achieved as a large scale integration (LSI) which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the previously-described implementations, the terminal apparatus has been described as an example of a communication apparatus, but the present disclosure is not limited to such a terminal apparatus, and is applicable to a terminal apparatus or a communication apparatus of a fixed-type or a stationary-type electronic apparatus installed indoors or outdoors, for example, such as an audio visual (AV) apparatus, a kitchen apparatus, a cleaning or washing machine, an air-conditioning apparatus, office equipment, a vending machine, and other household apparatuses.

The implementations of the present disclosure have been described in detail referring to the drawings, but the specific configuration is not limited to the implementations and includes, for example, any design that falls within the scope that does not depart from the gist of the present disclosure. Various modifications are possible within the scope of the present disclosure defined by claims, and implementations that are made by suitably combining technical means disclosed according to the different implementations are also included in the technical scope of the present disclosure. Furthermore, a configuration in which elements described in the respective implementations and having mutually the same effects, are substituted for one another is also included in the technical scope of the present disclosure.

What is claimed is:

1. A terminal apparatus for performing a listen-before-talk (LBT) procedure in a bandwidth part (BWP), the terminal apparatus comprising:

one or more non-transitory computer-readable media having computer-executable instructions embodied thereon; and at least one processor coupled to the one or more non-transitory computer-readable media, the at least one processor being configured to execute the computer-executable instructions to:

configure a plurality of control resource sets based on radio resource control (RRC) signaling, each of the plurality of control resource sets being a set of control channels to be monitored by the terminal apparatus;

monitor a plurality of physical downlink control channels (PDCCHs) in the plurality of control resource sets; and decode the plurality of PDCCHs, wherein:

each of the plurality of control resource sets is configured for a corresponding one of a plurality of LBT subbands in a bandwidth part (BWP), and each of the plurality of LBT subbands is a specific subband of the BWP.

2. The terminal apparatus according to claim 1, wherein in each of the plurality of control resource sets, a PDCCH of the plurality of PDCCHs is received and includes control information indicating a subframe configuration of a corresponding LBT subband of the plurality of LBT subbands.

3. The terminal apparatus according to claim 1, wherein each of the plurality of control resource sets is configured by using a plurality of resource blocks in a corresponding LBT subband of the plurality of LBT subbands.

4. A communication method used in a terminal apparatus for performing a listen-before-talk (LBT) procedure in a bandwidth part (BWP), the communication method comprising:

configuring a plurality of control resource sets based on radio resource control (RRC) signaling, each of the plurality of control resource sets being a set of control channels to be monitored by the terminal apparatus;

monitoring a plurality of physical downlink control channels (PDCCHs) in the plurality of control resource sets; and decoding the plurality of PDCCHs, wherein:

each of the plurality of control resource sets is configured for a corresponding one of a plurality of LBT subbands in a bandwidth part (BWP), and each of the plurality of LBT subbands is a specific subband of the BWP.

5. The communication method according to claim 4, wherein in each of the plurality of control resource sets, a PDCCH of the plurality of PDCCHs is received and includes control information indicating a subframe configuration of a corresponding LBT subband of the plurality of LBT subbands.

6. The communication method according to claim 4, wherein each of the plurality of control resource sets is configured by using a plurality of resource blocks in a corresponding LBT subband of the plurality of LBT subbands.

7. A base station apparatus for configuring a listen-before-talk (LBT) procedure in a bandwidth part (BWP), the base station apparatus comprising:

one or more non-transitory computer-readable media having computer-executable instructions embodied thereon; and at least one processor coupled to the one or more non-transitory computer-readable media, the at least one processor being configured to execute the computer-executable instructions to:

configure a plurality of control resource sets for a terminal apparatus, each of the plurality of control resource sets being a set of control channels to be monitored by the terminal apparatus; and transmit a plurality of physical downlink control channels (PDCCHs) in the plurality of control resource sets, wherein:

each of the plurality of control resource sets is configured for a corresponding one of a plurality of LBT subbands in a bandwidth part (BWP) for the terminal apparatus to perform the LBT procedure, and each of the plurality of LBT subbands is a specific subband of the BWP.

8. The base station apparatus according to claim 7, wherein in each of the plurality of control resource sets, a PDCCH of the plurality of PDCCHs is transmitted and includes control information indicating a subframe configuration of a corresponding LBT subband of the plurality of LBT subbands.

9. The base station apparatus according to claim 7, wherein each of the plurality of control resource sets is configured by using a plurality of resource blocks in a corresponding LBT subband of the plurality of LBT subbands.

10. A communication method used in a base station apparatus for configuring a listen-before-talk (LBT) procedure in a bandwidth part (BWP), the communication method comprising:

configuring a plurality of control resource sets for a terminal apparatus, each of the plurality of control resource sets being a set of control channels to be monitored by the terminal apparatus; and transmitting a plurality of physical downlink control channels (PDCCHs) in the plurality of control resource sets, wherein:

each of the plurality of control resource sets is configured for a corresponding one of a plurality of LBT subbands in a bandwidth part (BWP) for the terminal apparatus to perform the LBT procedure, and each of the plurality of LBT subbands is a specific subband of the BWP.

11. The communication method according to claim 10, wherein in each of the plurality of control resource sets, a PDCCH of the plurality of PDCCHs is transmitted and includes control information indicating a subframe configuration of a corresponding LBT subband of the plurality of LBT subbands.

12. The communication method according to claim 10, wherein each of the plurality of control resource sets is configured by using a plurality of resource blocks in a corresponding LBT subband of the plurality of LBT subbands.

* * * * *